US011926309B2

(12) United States Patent
Mizuguchi et al.

(10) Patent No.: US 11,926,309 B2
(45) Date of Patent: Mar. 12, 2024

(54) MOTOR CONTROL DEVICE

(71) Applicant: AISIN CORPORATION, Kariya (JP)

(72) Inventors: Hirotaka Mizuguchi, Kariya (JP); Satoshi Kokubo, Kariya (JP); Masahiko Kobayashi, Kariya (JP); Tomoki Inagaki, Anjo (JP); Masaaki Tominaga, Anjo (JP)

(73) Assignee: AISIN CORPORATION, Kariya (JP)

(*) Notice: Subject to any disclaimer, the term of this patent is extended or adjusted under 35 U.S.C. 154(b) by 464 days.

(21) Appl. No.: 17/311,848

(22) PCT Filed: Dec. 9, 2019

(86) PCT No.: PCT/JP2019/048092
§ 371 (c)(1),
(2) Date: Jun. 8, 2021

(87) PCT Pub. No.: WO2020/122018
PCT Pub. Date: Jun. 18, 2020

(65) Prior Publication Data
US 2022/0017061 A1    Jan. 20, 2022

(30) Foreign Application Priority Data

Dec. 10, 2018 (JP) ................................. 2018-231203
Jan. 18, 2019 (JP) ................................. 2019-007222

(51) Int. Cl.
*B60W 10/08* (2006.01)
*B60K 6/387* (2007.10)
(Continued)

(52) U.S. Cl.
CPC ............ *B60W 10/08* (2013.01); *B60K 6/387* (2013.01); *B60L 15/2054* (2013.01);
(Continued)

(58) Field of Classification Search
None
See application file for complete search history.

(56) References Cited

U.S. PATENT DOCUMENTS

2017/0284475 A1* 10/2017 Hertel ............... F16F 15/12366
2020/0049229 A1*  2/2020 Mizuguchi .......... B60W 30/188
2021/0246965 A1*  8/2021 Oi ....................... F16F 15/1464

FOREIGN PATENT DOCUMENTS

JP    2001136605 A  *  5/2001
JP    2013169953 A      9/2013
JP    2017100580 A      6/2017

OTHER PUBLICATIONS

Machine translation of JP2001136605A (Year: 2023).*
(Continued)

*Primary Examiner* — Aniss Chad
*Assistant Examiner* — Jennifer M Anda
(74) *Attorney, Agent, or Firm* — BUCHANAN INGERSOLL & ROONEY PC

(57) ABSTRACT

A motor control device which is an example of the present disclosure includes a hardware processor configured to: calculate damper torque on a basis of a difference between a crank angle and a motor angle; calculate, on a basis of the damper torque, reversed phase torque in reverse phase to the damper torque; calculate a correction amount for a phase of the reversed phase torque on a basis of a difference between a first value corresponding to a torsion angle between an input inertial member and an output inertial member and a second value corresponding to a torsion angle between an intermediate inertial member and the output inertial member; and output a motor torque command to be provided to a motor generator on a basis of the reversed phase torque a phase of which has been corrected in accordance with the correction amount.

15 Claims, 15 Drawing Sheets

(51) Int. Cl.
*B60L 15/20* (2006.01)
*B60W 20/17* (2016.01)

(52) U.S. Cl.
CPC .......... *B60W 20/17* (2016.01); *B60L 2240/14* (2013.01); *B60L 2240/421* (2013.01); *B60L 2240/423* (2013.01); *B60L 2240/443* (2013.01); *B60W 2510/0685* (2013.01)

(56) References Cited

OTHER PUBLICATIONS

International Search Report (PCT/ISA/210) and Written Opinion (PCT/ISA/237) dated Feb. 18, 2020, by the Japan Patent Office as the International Searching Authority for International Application No. PCT/JP2019/048092.

* cited by examiner

MOTOR CONTROL DEVICE

CROSS-REFERENCE TO RELATED APPLICATIONS

This application is national stage application of International Application No. PCT/JP2019/048092, filed Dec. 9, 2019, which designates the United States, incorporated herein by reference, and which claims the benefit of priority from Japanese Application No. 2018-231203, filed on Dec. 10, 2018 and Japanese Application No. 2019-007222, filed on Jan. 18, 2019, the entire contents of which are incorporated herein by reference.

TECHNICAL FIELD

The present disclosure relates to a motor control device.

BACKGROUND ART

There has been known conventional technique for estimating damper torque generated by a damper, which reduces vibrations of a crankshaft of an engine and includes an input inertial member and an output inertial member, and outputting motor torque in reverse phase to the estimated damper torque by a motor generator to reduce vibrations occurring due to the damper torque. In such a conventional technique, the damper torque is estimated, for example, based on a torsion angle between the input inertial member and the output inertial member.

CITATION LIST

Patent Literature

Patent Document 1: JP 2013-169953 A

SUMMARY OF INVENTION

Problem to be Solved by the Invention

Meanwhile, a damper configuration that includes an intermediate inertial member between an input inertial member and an output inertial member can be considered. In order to estimate the damper torque in this configuration, it is necessary to take into account a torsion angle between the intermediate inertial member and the output inertial member.

The conventional technique described above however takes into account only the torsion angle between the input inertial member and the output inertial member without taking into account the characteristics of the intermediate inertial member. Therefore, even if the conventional technique described above is applied to the configuration including the intermediate inertial member between the input inertial member and the output inertial member, the damper torque in the configuration including the intermediate inertial member between the input inertial member and the output inertial member cannot be accurately estimated, and thus the vibrations occurring due to the damper torque cannot be effectively reduced.

Thus, one of objects of the present disclosure is to provide a motor control device capable of reducing vibrations occurring in response to damper torque.

Means for Solving Problem

As an example of the present disclosure, a motor control device for a vehicle includes a hardware processor. The vehicle includes: an engine and a motor generator each serving as a power source; a transmission that transmits, to a wheel side, driving torque based on at least one of engine torque of a crankshaft of the engine and motor torque of a motor shaft of the motor generator at a selected change gear ratio; and a damper including an input inertial member connected to the crankshaft, an intermediate inertial member connected to the input inertial member via at least a first elastic member, and an output inertial member connected to the intermediate inertial member via at least a second elastic member on an opposite side to the input inertial member, the damper being configured to reduce vibration of the crankshaft. The hardware processor is configured to: calculate damper torque generated by the damper in accordance with a fluctuation of the engine torque on a basis of a difference between a crank angle as a rotation angle of the crankshaft and a motor angle as a rotation angle of the motor shaft; calculate, on a basis of the calculated damper torque, reversed phase torque in reverse phase to the damper torque; calculate a correction amount for a phase of the calculated reversed phase torque on a basis of a difference between a first value corresponding to a torsion angle between the input inertial member and the output inertial member and a second value corresponding to a torsion angle between the intermediate inertial member and the output inertial member; and output a motor torque command to be provided to the motor generator on a basis of the reversed phase torque a phase of which has been corrected in accordance with the calculated correction amount.

According to the motor control device described above, the reversed phase torque can be corrected with the correction amount based on the difference between the first value and the second value so that the effect of the torsion angle between the input inertial member and the intermediate inertial member is eliminated. Thus, the vibrations occurring in response to the damper torque of the damper including the intermediate inertial member between the input inertial member and the output inertial member can be reduced.

In the motor control device described above, the hardware processor is configured to output the motor torque command in a case where a clutch disposed between the engine and the transmission is in a connected state in which the crankshaft of the engine and an input shaft of the transmission are connected, and output the motor torque command to set the motor torque to zero in a case where the clutch is in a disconnected state in which a connection between the crankshaft and the input shaft is disconnected. According to such a configuration, it is possible to switch between generating and not generating of the motor torque for reducing the effect of the damper torque depending on whether the damper torque is transmitted to the wheel side via the clutch.

In this case, the hardware processor is configured to output the motor torque command to set the motor torque to zero in a case where an acceleration operation of accelerating the vehicle is not being performed even if the clutch is in the connected state. According to such a configuration, generating and not generating of the motor torque for reducing the effect of the damper torque can be switched depending on whether or not the damper torque is transmitted to the wheel side via the clutch in further consideration of the presence or absence of the acceleration operation in addition to the state of the clutch.

In the motor control device described above, the hardware processor is configured to obtain the first value on the basis of the difference in phase of the vibration component corresponding to the primary frequency of the explosion of the engine between the crank angle and the motor angle.

According to such a configuration, an appropriate first value can be easily obtained on the basis of the phase difference between the crank angle and the motor angle.

In the motor control device described above, the hardware processor is configured to obtain the second value on the basis of at least one of a number of rotations of the engine and a number of speeds of the transmission. According to such a configuration, an appropriate second value can be obtained taking into account at least one of the number of rotations of the engine and the number of speeds of the transmission, which are possible factors that change the second value.

In this case, the motor control device further includes a map indicating a relationship between a number of rotations of the engine, a number of speeds of the transmission, and the second value. The hardware processor is configured to obtain the second value by referring to the map on the basis of the number of rotations of the engine and the number of speeds of the transmission. According to such a configuration, a further appropriate second value can be easily obtained using the map.

As another example of the present disclosure, a motor control device for a vehicle includes a hardware processor. The vehicle includes: an engine and a motor generator each serving as a power source; a transmission that transmits, to a wheel side, driving torque based on at least one of engine torque of a crankshaft of the engine and motor torque of a motor shaft of the motor generator at a selected change gear ratio; and a damper including an input inertial member connected to the crankshaft, an output inertial member connected to the input inertial member via an elastic member, and a dynamic vibration absorber disposed on at least one of the input inertial member and the output inertial member, the damper being configured to reduce vibration of the crankshaft. The hardware processor is configured to: calculate calculational damper torque that is generated by the damper in accordance with a fluctuation of the engine torque on a basis of a difference between a crank angle as a rotation angle of the crankshaft detected by a first sensor disposed on the vehicle and a motor angle as a rotation angle of the motor shaft detected by a second sensor disposed on the vehicle; calculate a reversed phase torque in reverse phase to the calculated calculational damper torque; calculate, on a basis of at least the crank angle detected by the first sensor and the motor angle detected by the second sensor, at least one of a phase correction amount and an amplitude correction amount for correcting, respectively, a phase shift and an amplitude shift between the calculational damper torque and actual damper torque generated by the damper, the phase shift and the amplitude shift occurring due to dynamic vibration absorption torque generated by the dynamic vibration absorber; and output a motor torque command to be provided to the motor generator on a basis of the reversed phase torque having been corrected based on at least one of the phase correction amount and the amplitude correction amount.

According to the motor control device described above, the reversed phase torque is corrected on the basis of at least one of the phase correction amount and the amplitude correction amount so that at least one of the phase shift and the amplitude shift occurring due to the dynamic vibration absorption torque is canceled, and the motor torque command corresponding to the reversed phase torque having been corrected can be output. This enables reduction of the vibrations occurring in response to the damper torque of the damper including the dynamic vibration absorber.

Moreover, in the motor control device described above, the hardware processor is configured to output the motor torque command in a case where a clutch disposed between the engine and the transmission is in a connected state in which the crankshaft of the engine and an input shaft of the transmission are connected, and output the motor torque command to set the motor torque to zero in a case where the clutch is in a disconnected state in which a connection between the crankshaft and the input shaft is disconnected. According to such a configuration, it is possible to switch between generating and not generating of the motor torque for reducing the effect of the damper torque depending on whether the damper torque is transmitted to the wheel side via the clutch.

In this case, the hardware processor is configured to output the motor torque command to set the motor torque to zero in a case where an acceleration operation of accelerating the vehicle is not being performed even if the clutch is in the connected state. According to such a configuration, generating and not generating of the motor torque for reducing the effect of the damper torque can be switched depending on whether or not the damper torque is transmitted to the wheel side via the clutch in further consideration of the presence or absence of the acceleration operation in addition to the state of the clutch.

Moreover, in the motor control device described above, the hardware processor is configured to calculate the phase correction amount on the basis of a difference between a first value and a second value, the first value corresponding to a difference in phase between the crank angle and the motor angle assumed on a presumption that the dynamic vibration absorption torque does not occur, the second value corresponding to a difference in phase of a vibration component corresponding to a primary frequency of an explosion of the engine between the crank angle detected by the first sensor and the motor angle detected by the second sensor. According to such a configuration, the phase correction amount corresponding to the phase shift occurring due to the dynamic vibration absorption torque can be easily obtained on the basis of the difference between the first value and the second value.

In this case, the hardware processor is configured to obtain the first value on the basis of a number of rotations of the engine detected by a third sensor disposed on the vehicle and a number of speeds of the transmission detected by a fourth sensor disposed on the vehicle. According to such a configuration, an appropriate first value can be obtained taking into account the number of rotations of the engine and the number of speeds of the transmission, which are possible factors that change the first value.

Moreover, in this case, the motor control device further includes a first map indicating a relationship between the number of rotations of the engine, the number of speeds of the transmission, and the first value. The hardware processor is configured to obtain the first value by referring to the first map on the basis of the number of rotations of the engine detected by the third sensor and the number of speeds of the transmission detected by the fourth sensor. According to such a configuration, an appropriate first value can be easily obtained using the first map.

Moreover, in the motor control device described above, the hardware processor is configured to obtain the amplitude correction amount on the basis of the number of rotations of the engine detected by the third sensor disposed on the vehicle and the number of speeds of the transmission detected by the fourth sensor disposed on the vehicle. According to such a configuration, an appropriate amplitude correction amount can be obtained taking into account the number of rotations of the engine and the number of speeds of the transmission, which are possible factors that change the amplitude correction amount in accordance with the amplitude shift occurring due to the dynamic vibration absorption torque.

In this case, the motor control device further includes a second map indicating a relationship between the number of rotations of the engine, the number of speeds of the transmission, and the amplitude correction amount. The hardware processor is configured to obtain the amplitude correction amount by referring to the second map on the basis of the number of rotations of the engine detected by the third sensor and the number of speeds of the transmission detected by the fourth sensor. According to such a configuration, an appropriate amplitude correction amount can be easily obtained using the second map.

Moreover, in the motor control device described above, the hardware processor is configured to obtain both the phase correction amount and the amplitude correction amount. The hardware processor is configured to output the motor torque command on the basis of the reversed phase torque that has been corrected so that the phase correction amount is added to or subtracted from a phase component and that an amplitude component is multiplied by the amplitude correction amount. According to such a configuration, the reversed phase torque can be appropriately corrected on the basis of both the phase correction amount and the amplitude correction amount, and an appropriate motor torque command can be output in accordance with the reversed phase torque having been corrected.

DESCRIPTION OF EMBODIMENTS

Hereinafter, embodiments of the present disclosure will be described on the basis of the drawings. The configurations of the embodiments described below and the actions and results (effects) which are brought about by the configurations are only examples and are not limited to those described below.

First Embodiment

Figure 1:
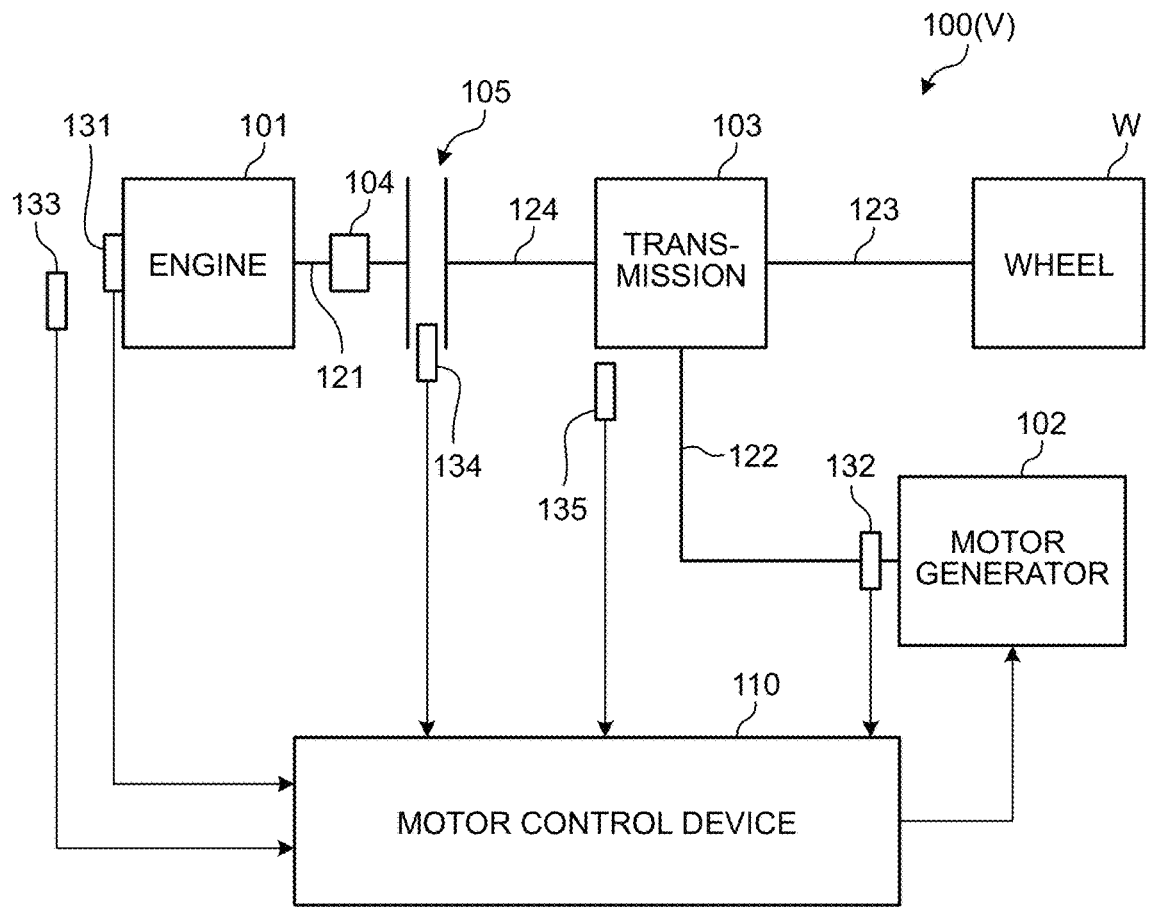
FIG. 1 is an exemplary and schematic block diagram illustrating a configuration of a drive system of a vehicle including a motor control device according to a first embodiment.

FIG. 1 is an exemplary and schematic block diagram illustrating a configuration of a drive system 100 of a vehicle V including a motor control device 110 according to the first embodiment.

As illustrated in FIG. 1, a drive system 100 of a vehicle V according to the first embodiment includes an engine 101, a motor generator 102, a transmission 103, a damper 104, a clutch 105, and a motor control device 110.

The engine 101 and the motor generator 102 are each a power source of the vehicle V. The engine 101 outputs engine torque in accordance with the control of an engine ECU (not illustrated) to rotate a crankshaft 121. Similarly, the motor generator 102 outputs motor torque in accordance with the control of the motor control device 110 to rotate a motor shaft 122.

The transmission 103 transmits driving torque based on at least one of the engine torque of the crankshaft 121 of the engine 101 and the motor torque of the motor shaft 122 of the motor generator 102 at a selected change gear ratio to a wheel W side. The driving torque is transmitted to the wheel W side as drive shaft torque via a drive shaft 123.

The damper 104 is a torque fluctuation absorbing device which reduces (absorbs) vibrations of the crankshaft 121, that is, the fluctuations of the engine torque. The damper 104 generates damper torque including torsion torque and hysteresis torque in accordance with the fluctuations of the engine torque, on the basis of a configuration as illustrated in the following FIG. 2.

Figure 2:
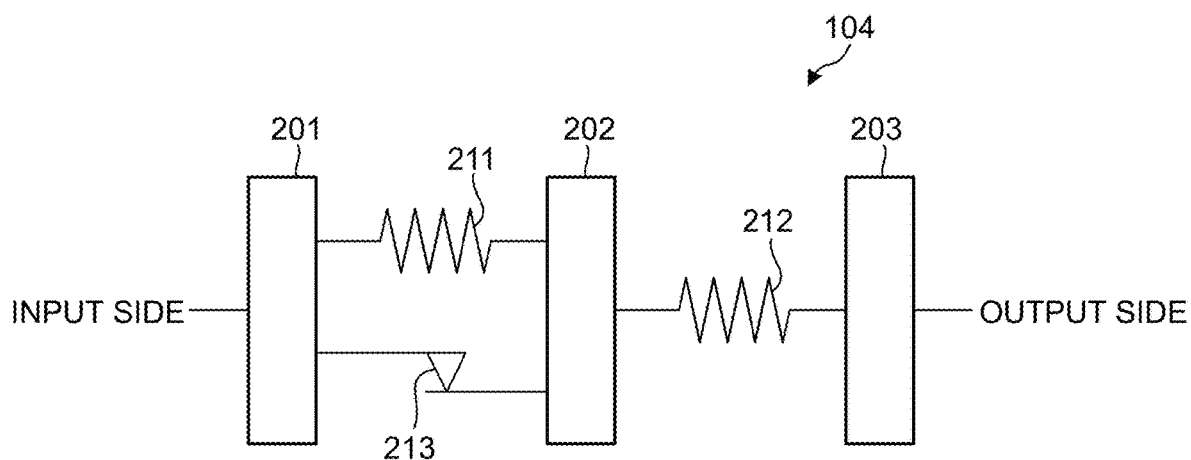
FIG. 2 is an exemplary and schematic diagram illustrating a configuration of a damper according to the first embodiment.

FIG. 2 is an exemplary and schematic diagram illustrating a configuration of the damper 104 according to the first embodiment. As illustrated in FIG. 2, the damper 104 according to the first embodiment includes an input inertial member 201, an intermediate inertial member 202, and an output inertial member 203. The input inertial member 201, the intermediate inertial member 202, and the output inertial member 203 each have a structure that is mutually relatively rotatable about the same rotational center.

The input inertial member 201 is connected to the crankshaft 121 of the engine 101. Specifically, the input inertial member 201 is disposed on an input side to which the fluctuations of the engine torque is input in the damper 104.

The intermediate inertial member 202 is connected to the input inertial member 201 via an elastic member 211 and a friction member 213. Thus, a transmission path of torsion torque caused by the elastic member 211 and a transmission path of hysteresis torque caused by the friction member 213 are formed between the input inertial member 201 and the intermediate inertial member 202. Note that the elastic member 211 is an example of a "first elastic member".

The output inertial member 203 is disposed on an output side from which the damper torque is output in the damper 104. More specifically, the output inertial member 203 is connected to the intermediate inertial member 202 via the elastic member 212 on the opposite side to the input inertial member 201. Thus, the transmission path of torsion torque caused by the elastic member 212 is formed between the intermediate inertial member 202 and the output inertial member 203. The elastic member 212 is an example of a "second elastic member.

Returning to FIG. 1, the clutch 105 which is disposed between the engine 101 and the transmission 103 switches between connection and disconnection between the crankshaft 121 of the engine 101 and an input shaft 124 of the transmission 103. More specifically, the clutch 105 executes the transmission of the torque (at least part of the torque) between the crankshaft 121 and an input shaft 124 in a case where the clutch 105 is in a connected state in which the crankshaft 121 and the input shaft 124 are connected, and blocks the transmission of the torque between the crankshaft 121 and the input shaft 124 in a case where the clutch 105 is in a disconnected state in which the connection between the crankshaft 121 and the input shaft 124 is disconnected.

The motor control device 110 is, for example, an electronic control module (ECU) configured as a microcomputer provided with hardware, such as a processor and a memory, similar to that of an ordinary computer. The motor control device 110 controls the motor torque of the motor generator 102 by providing a motor torque command as a command value to the motor generator 102.

The motor control device 110 can use various sensors disposed in the vehicle V for control. In an example illustrated in FIG. 1, a crank angle sensor 131, a motor angle sensor 132, an accelerator position sensor 133, a clutch position sensor 134, and a shift position sensor 135 are illustrated as the various sensors.

The crank angle sensor 131 detects a crank angle as a rotation angle of the crankshaft 121. The motor angle sensor 132 detects a motor angle as a rotation angle of the motor shaft 122.

The accelerator position sensor 133 detects whether or not an acceleration operation of accelerating the vehicle V is being performed by a driver by detecting an operation amount (operation position) and the like of an acceleration operation unit for operating the acceleration operation (not illustrated), such as an accelerator pedal. The clutch position sensor 134 detects whether the clutch 105 is in the connected state or the disconnected state by detecting an operation amount (operation position) and the like of a clutch operation unit for operating the clutch 105 (not illustrated), such as a clutch pedal.

The shift position sensor 135 detects the number of speeds (shift stage) that is currently set in the transmission 103.

By the way, a conventional technique has been known in which vibrations occurring due to damper torque is reduced by estimating the damper torque generated by a damper and outputting motor torque that is in reverse phase to the estimated damper torque. Here, the damper does not include a configuration corresponding to the intermediate inertial member 202 according to the first embodiment, that is, the damper includes (only) a configuration corresponding to the input inertial member 201 and a configuration corresponding to the output inertial member 203. In such a conventional technique, the damper torque is estimated on the basis of a difference between the crank angle and the motor angle, that is, a torsion angle between the input inertial member 201 and the output inertial member 203.

However, in a configuration that includes the intermediate inertial member 202 between the input inertial member 201 and the output inertial member 203, as in the damper 104 according to the first embodiment, the damper torque to be canceled by the motor torque cannot be accurately estimated with the characteristics of the intermediate inertial member 202 not being taken into account.

More specifically, in the configuration that includes the intermediate inertial member 202 between the input inertial member 201 and the output inertial member 203, in order to accurately estimate the damper torque, it is important to take into account the torsion angle between the intermediate inertial member 202 and the output inertial member 203. In the foregoing conventional technique, however, only the torsion angle between the input inertial member 201 and the output inertial member 203 is taken into account without taking into account the characteristics of the intermediate inertial member 202. Thus, the damper torque in the configuration including the intermediate inertial member 202 between the input inertial member 201 and the output inertial member 203 cannot be accurately estimated.

Figure 3A:
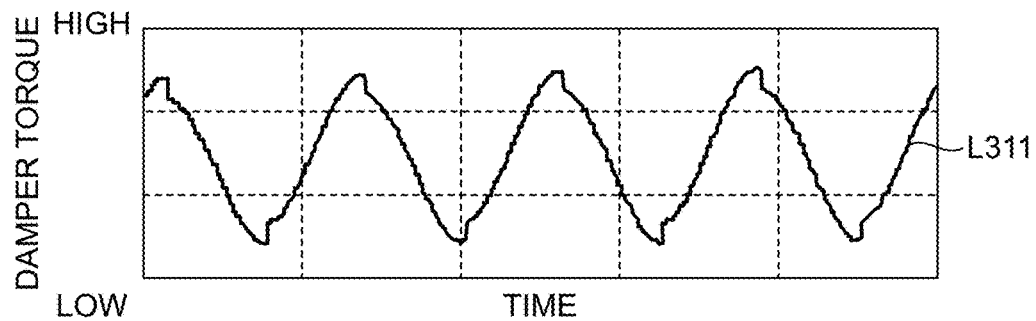
FIGS. 3A to 3C are exemplary and schematic diagrams illustrating fluctuation levels of damper torque, motor torque, and drive shaft torque realized through a technique according to a first comparative example.
Figure 3B:
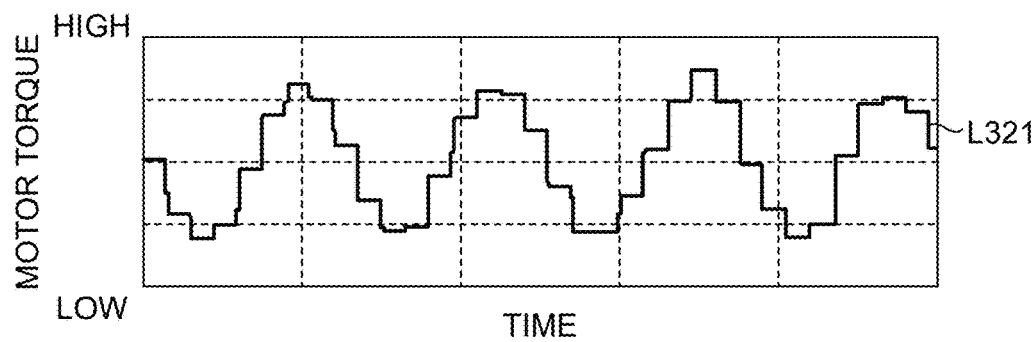
Figure 3C:
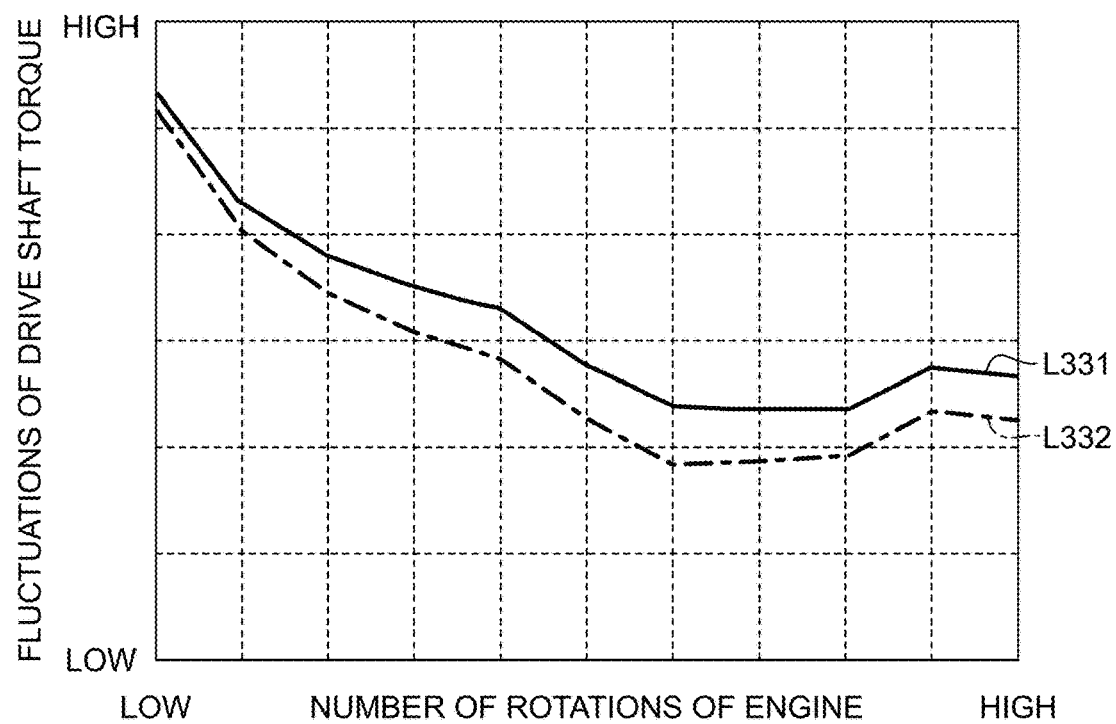

Accordingly, even if a technique according to a first comparative example which is based on a technical concept similar to the conventional technique described above is applied to the damper 104 according to the first embodiment in which the intermediate inertial member 202 is included between the input inertial member 201 and the output inertial member 203, vibrations occurring due to the damper torque, that is, the fluctuations of the drive shaft torque, cannot be appropriately reduced, as in an example illustrated in the following FIGS. 3A to 3C.

FIGS. 3A to 3C are exemplary and schematic diagrams illustrating the fluctuations of each of the damper torque, the motor torque, and the drive shaft torque realized in a case where the technique according to the first comparative example is applied to the damper 104 according to the first embodiment. In the technique according to the first comparative example, the damper torque is estimated on the basis of the difference between the crank angle and the motor angle, and the motor torque that is in reverse phase to the estimated damper torque is output, as in the conventional technique described above.

In an example illustrated in FIG. 3A, solid line L311 corresponds to an example of changes over time in the (actual) damper torque of the damper 104 according the first embodiment. In an example illustrated in FIG. 3B, solid line L321 corresponds to an example of changes over time in the motor torque that is output based on estimation damper torque which is estimated through the technique according to the first comparative example.

As can be seen by comparing the solid line L311 with the solid line L321, in the technique according to the first comparative example, the damper torque and the motor torque are not completely in opposite phase, and a phase shift occurs. Therefore, in the technique according to the first comparative example, the fluctuations of the drive shaft torque cannot be appropriately reduced, as in an example illustrated in the following FIG. 3C.

In the example illustrated in FIG. 3C, the solid line L331 corresponds to an example of the fluctuations of the drive shaft torque with respect to the number of rotations of the engine 101 in a case where the damping control that attempts to cancel out the damper torque illustrated in FIG. 3A is performed with the motor torque illustrated in FIG. 3B. Single chain line L332 corresponds to an example of the fluctuations of the drive shaft torque with respect to the number of rotations of the engine 101 in a case where the damping control is not performed.

As can be seen by comparing the solid line L331 with the single chain line L332, in the technique according to the first comparative example, the level of fluctuations of the drive shaft torque is rather worse in the case where the damping control is performed than in the case where the damping control is not performed. This is because, in the technique according to the first comparative example, the damper torque is inaccurately estimated without taking into account the characteristics of the intermediate inertial member 202, and the motor torque is determined on the basis of this inaccurate damper torque as described above.

Thus, for the damper 104 according to the first embodiment, which includes the intermediate inertial member 202 between the input inertial member 201 and the output inertial member 203, it is desirable to reduce the fluctuations of the drive shaft torque, that is, the vibrations occurring in response to the damper torque, through a technique different from the technique according to the first comparative example.

Accordingly, the first embodiment realizes the reducing of the vibrations occurring in response to the damper torque of the damper 104 that includes the intermediate inertial member 202 between the input inertial member 201 and the output inertial member 203 by realizing a functional module group as illustrated in the following FIG. 4, in the motor control device 110.

Figure 4:
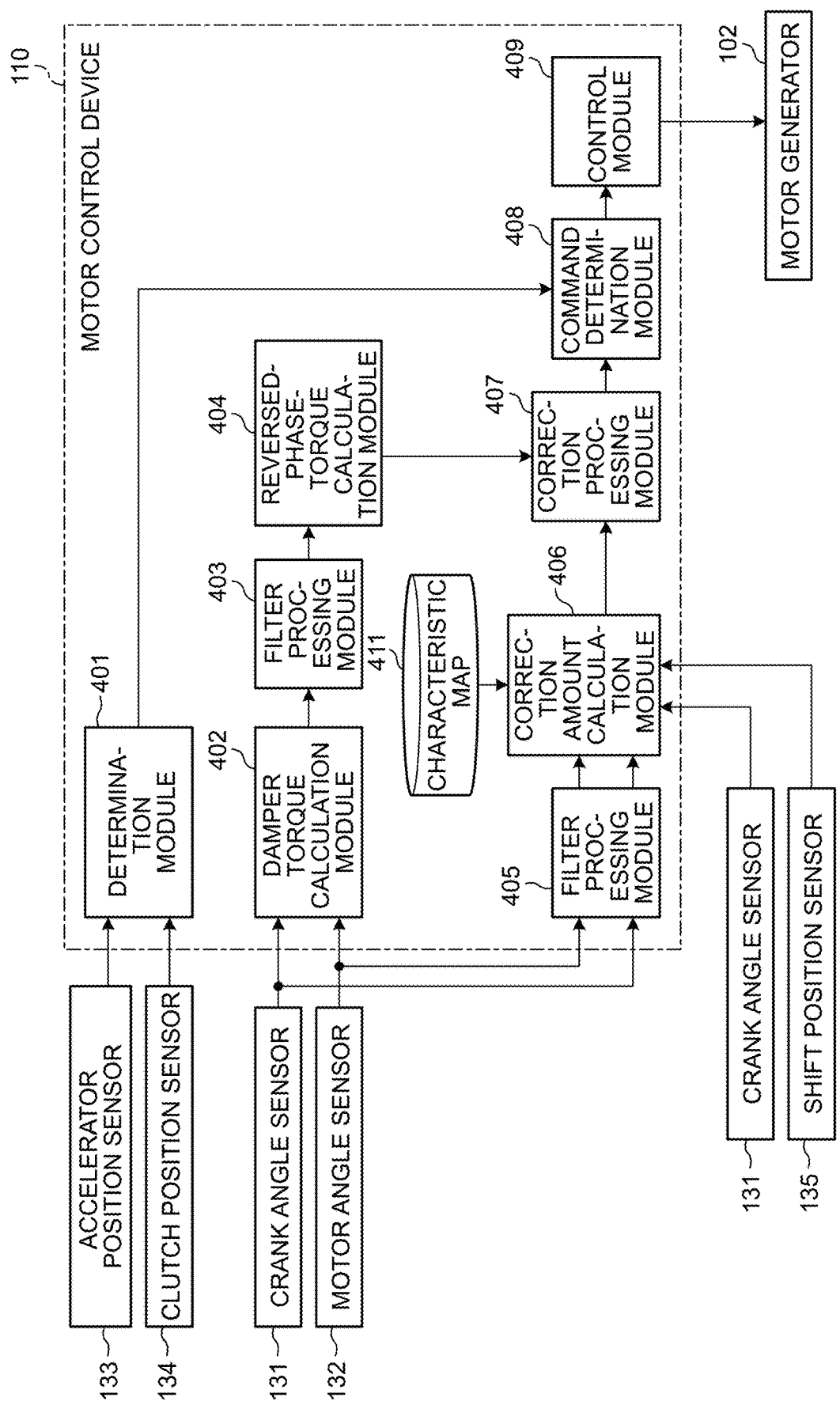
FIG. 4 is an exemplary and schematic block diagram illustrating a functional module group included in the motor control device according to the first embodiment.

FIG. 4 is an exemplary and schematic block diagram illustrating the functional module group included in the motor control device 110 according to the first embodiment. The functional module group illustrated in FIG. 4 is realized by the cooperation of hardware and software, for example, as a result of a processor of the motor control device 110 reading a control program stored in a memory or the like. Note that, in the first embodiment, part or all of the functional module group illustrated in FIG. 4 may be realized by dedicated hardware (circuit).

As illustrated in FIG. 4, the motor control device 110 includes a determination module 401, a damper torque calculation module 402, a filter processing module 403, a reversed-phase-torque calculation module 404, a filter processing module 405, a correction amount calculation module 406, a correction processing module 407, a command determination module 408, and a control module 409, each serving as a functional module. The motor control device 110 further includes a characteristic map 411 as data to be used for control.

The determination module 401 determines whether or not to output the motor torque for canceling out the damper torque to reduce the vibrations of the drive shaft 123 on the basis of results of the detections made by the accelerator position sensor 133 and the clutch position sensor 134. Note that the motor torque for reducing the vibrations of the drive shaft 123 may be referred to as damping torque in the following.

For example, in a case where the clutch 105 is in the disconnected state, or in a case where the clutch 105 is in the connected state but no acceleration operation is being performed, the fluctuations of the engine torque is not transmitted to the drive shaft 123, so that there is no need to output the damping torque. Accordingly, in order to set the damping torque to zero, the determination module 401 notifies the command determination module 408 that there is no need to output the damping torque, in such a case.

On the other hand, in a case where the clutch 105 is in the connected state and the acceleration operation is being performed, the fluctuations of the engine torque is transmitted to the drive shaft 123, so that it is necessary to reduce the vibrations with the damping torque. Accordingly, in order to output the damping torque for canceling out the damper torque, the determination module 401 notifies the command determination module 408 that the damping torque needs to be output, in such a case.

The damper torque calculation module 402 calculates (estimates), through the calculation described below, estimation damper torque in which the torsion angle between the input inertial member 201 and the output inertial member 203 is taken into account, as in the technique according to the foregoing first comparative example, on the basis of the results of the detections made by the crank angle sensor 131 and the motor angle sensor 132.

Specifically, if the crank angle which is the result of the detection made by the crank angle sensor 131 is denoted by $\theta 1$ and the motor angle which is the result of the detection made by the motor angle sensor 132 is denoted by $\theta 2$, the damper torque calculation module 402 calculates the torsion angle between the input inertial member 201 and the output inertial member 203 on the basis of the formula $(\theta 1 - \theta 2)$, which expresses a difference between $\theta 1$ and $\theta 2$. Then, if a rotational spring constant of the damper 104 is denoted by K, the damper torque calculation module 402 calculates the estimation damper torque on the basis of multiplication of the torsion angle of the damper 104, which is expressed by $(\theta 1 - \theta 2)$, by K.

As described above, the damper 104 according to the first embodiment includes two elastic members 211 and 212. These two elastic members 211 and 212 can be said to be connected in series with each other (see FIG. 2). Thus, in the above calculation for calculating the estimation damper torque, if the rotational spring constant of each of the elastic members 211 and 212 are denoted by K1 and K2, respectively, the damper torque calculation module 402 calculates, as K which represents the rotational spring constant of the damper 104, a combined spring constant that is expressed by the formula $(K1 \times K2)/(K1+K2)$.

The filter processing module 403 performs a filtering process on the result of the calculation made by the damper torque calculation module 402 to extract a vibration component corresponding to a primary frequency of the explosion of the engine 101. The filter processing module 403 realizes such an extraction process by means of, for example, a bandpass filter the pass-band of which is the frequency band corresponding to the primary frequency of the explosion of the engine 101.

The reversed-phase-torque calculation module 404 calculates reversed phase torque that is in reverse phase to the estimation damper torque based on which the damping torque is calculated, by performing a phase inversion process or the like on the result of the extraction made by the filter processing module 403.

By the way, the damper torque to be canceled out in the damper 104 according to the first embodiment is a value based on the torsion angle between the intermediate inertial member 202 and the output inertial member 203, as described above.

In contrast to this, the estimation damper torque to be input to the reversed-phase-torque calculation module 404 as the basis for the calculation of the reversed phase torque is a value based on the torsion angle between the input inertial member 201 and the output inertial member 203, that is, a value including both the torsion angle between the input inertial member 201 and the intermediate inertial member 202, and the torsion angle between the intermediate inertial member 202 and the output inertial member 203.

Thus, in order to effectively reduce the vibrations occurring in response to the damper torque, it is necessary to correct the reversed phase torque calculated by the reversed-phase-torque calculation module 404, for a shift corresponding to the torsion angle between the input inertial member 201 and the intermediate inertial member 202.

Here, there is a relationship as illustrated in the following FIG. 5 between the torsion angle between the input inertial member 201 and the output inertial member 203, the torsion angle between the input inertial member 201 and the intermediate inertial member 202, and the torsion angle between the intermediate inertial member 202 and the output inertial member 203.

Figure 5:
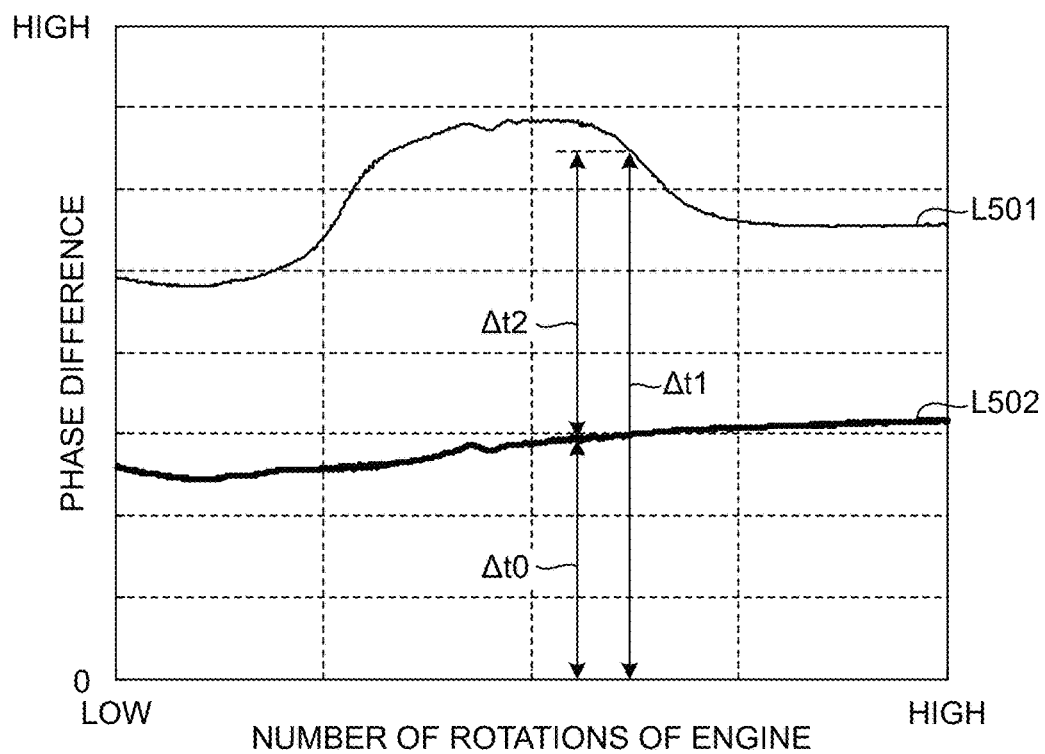
FIG. 5 is an exemplary and schematic diagram illustrating an example of a phase difference which may occur in the damper according to the first embodiment.

FIG. 5 is an exemplary and schematic diagram illustrating an example of a phase difference which may occur in the damper 104 according to the first embodiment. In the example illustrated in FIG. 5, solid line L501 corresponds to an example of the relationship between the number of rotations of the engine 101 and the torsion angle (a phase difference indicating the torsion angle) between the input inertial member 201 and the output inertial member 203, and solid line L502 corresponds to an example of the relationship between the number of rotations of the engine 101 and the torsion angle (a phase difference indicating the torsion angle) between the input inertial member 201 and the intermediate inertial member 202.

As illustrated in FIG. 5, there is a phase difference $\Delta t2$ between a torsion angle (a phase difference indicating the torsion angle) $\Delta t1$ between the input inertial member 201 and the output inertial member 203 and a torsion angle (a phase difference indicating the torsion angle) $\Delta t0$ between the input inertial member 201 and the intermediate inertial member 202. This phase difference $\Delta t2$ corresponds to the torsion angle (a phase difference indicating the torsion angle) between the intermediate inertial member 202 and the output inertial member 203.

In this way, it can be said that there is the relationship that is $\Delta t0=\Delta t1-\Delta t2$, between the torsion angle (phase difference indicating the torsion angle) $\Delta t1$ between the input inertial member 201 and the output inertial member 203, the torsion angle (phase difference indicating the torsion angle) $\Delta t2$ between the intermediate inertial member 202 and the output inertial member 203, and the torsion angle (phase difference indicating the torsion angle) $\Delta t0$ between the input inertial member 201 and the intermediate inertial member 202.

Thus, in the first embodiment, the torsion angle between the input inertial member 201 and the intermediate inertial member 202 is calculated on the basis of the difference between the torsion angle between the input inertial member 201 and output inertial member 203 and the torsion angle between the intermediate inertial member 202 and the output inertial member 203, and then, the reversed phase torque calculated by the reversed-phase-torque calculation module 404 is corrected on the basis of the calculation result with the configuration as described below.

Referring back to FIG. 4, the filter processing module 405 performs the filtering process on the results of the detections made by the crank angle sensor 131 and the motor angle sensor 132 to extract vibration components corresponding to the primary frequency of the explosion of the engine 101. As in the filter processing module 403, the filter processing module 405 realizes such an extraction process by means of, for example, a bandpass filter the pass-band of which is the frequency band corresponding to the primary frequency of the explosion of the engine 101.

The correction amount calculation module 406 calculates a correction amount for the phase of the reversed phase torque on the basis of the result of the extraction made by the filter processing module 405 and the results of the detections made by the accelerator position sensor 133 and the shift position sensor 135.

More specifically, the correction amount calculation module 406 calculates the correction amount on the basis of a difference between a first value and a second value. The first value corresponds to the difference in phase of the vibration component corresponding to the primary frequency of the explosion of the engine 101 between the crank angle and the motor angle. The second value corresponds to the torsion angle (the estimation phase difference indicating the torsion angle) between the intermediate inertial member 202 and the output inertial member 203. Note that, hereinafter, the first value may be referred to as an actual phase difference and the second value may be referred to as a characteristic phase difference.

The actual phase difference can be calculated on the basis of the result of the extraction made by the filter processing module 405. Specifically, the filter processing module 405 extracts the vibration component corresponding to the primary frequency of the explosion of the engine 101 for each of the crank angle as the result of the detection made by the crank angle sensor 131 and the motor angle as the result of the detection made by the motor angle sensor 132, as described above. Thus, it is possible to calculate the actual phase difference by comparing these extraction results, for example, as in a form illustrated in the following FIG. 6.

Figure 6:
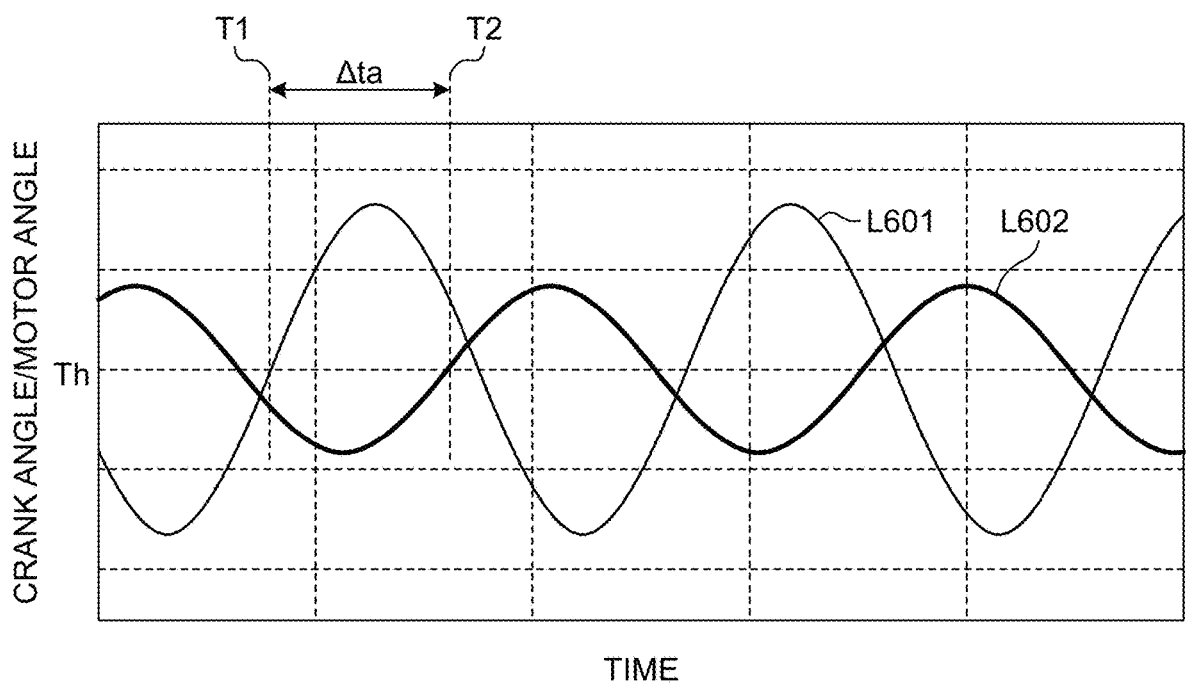
FIG. 6 is an exemplary and schematic diagram illustrating an example of a phase difference between the crank angle and the motor angle in the first embodiment.

FIG. 6 is an exemplary and schematic diagram illustrating an example of the phase difference between the crank angle and the motor angle in the first embodiment. In the example illustrated in FIG. 6, solid line L601 represents changes over time in the vibration component corresponding to the primary frequency of the explosion of the engine 101 for the crank angle. Solid line L602 represents changes over time in the vibration component corresponding to the primary frequency of the explosion of the engine 101 for the motor angle.

As illustrated in FIG. 6, there is a predetermined time difference Δta (=T1−T2) between a timing T1 when the crank angle exceeds a predetermined threshold Th and the timing T2 when the motor angle exceeds the predetermined threshold Th. The correction amount calculation module 406 obtains the time difference Δta on the basis of the result of the extraction made by the filter processing module 405, and calculates the actual phase difference on the basis of the time difference Δta.

Note that, in the example illustrated in FIG. 6, the actual phase difference may be calculated on the basis of a difference between a timing when the crank angle falls below the predetermined threshold Th and a timing when the motor angle falls below the predetermined threshold Th.

In contrast, the characteristic phase difference can be calculated on the basis of the results of the detections made by the crank angle sensor 131 and the shift position sensor 135, and the characteristic map 411 as illustrated in the following FIG. 7.

Figure 7:
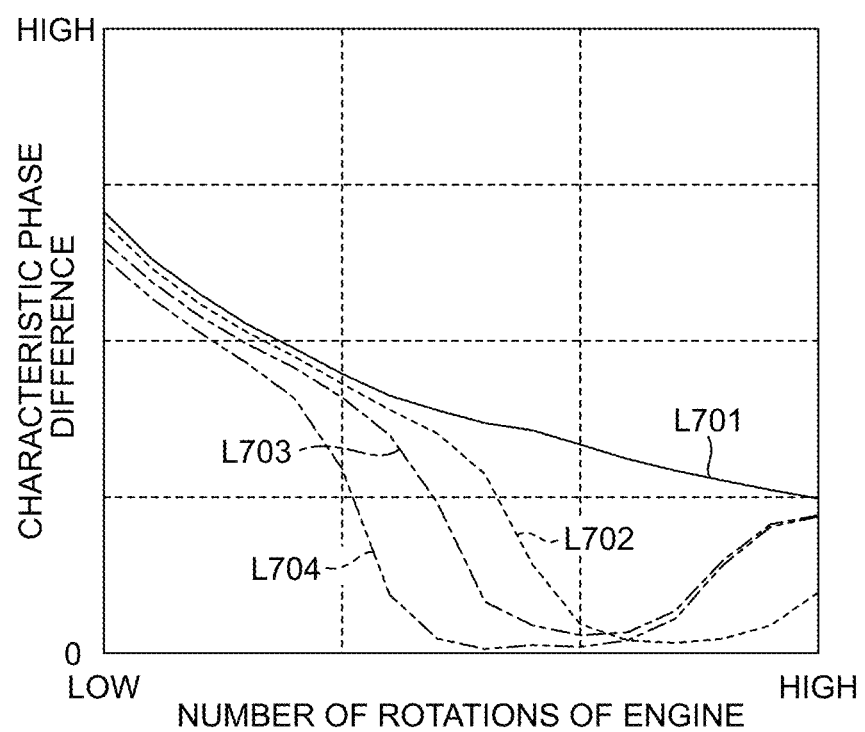
FIG. 7 is an exemplary and schematic diagram illustrating an example of a characteristic map according to the first embodiment.

FIG. 7 is an exemplary and schematic diagram illustrating an example of the characteristic map 411 according to the first embodiment. As illustrated in FIG. 7, the characteristic map 411 is data that has been preset to indicate the relationship between the number of rotations of the engine 101, the number of speeds of the transmission 103, and the characteristic phase difference.

In the characteristic map 411, the relationship between the number of rotations of the engine 101 and the characteristic phase difference is defined as a plurality of lines each corresponding to the stage of the number of speeds (solid line L701, dashed line L702, single chain line L703, and two-dot chain line L704). The solid line L701 corresponds to the relationship between the characteristic phase difference and the number of rotations of the engine 101 at the number of speeds in a range from a low speed to a medium speed (e.g., from the first speed to the third speed). The dashed line L702 corresponds to the relationship between the characteristic phase difference and the number of rotations of the engine 101 at the number of speeds higher than the number of speeds for the solid line L701 (e.g., the fourth speed). Further, the single chain line L703 corresponds to the relationship between the characteristic phase difference and the number of rotations of the engine 101 at the number of speeds even higher than the number of speeds for the dashed line L702 (e.g., the fifth speed). The two-dot chain line L704 corresponds to the relationship between the characteristic phase difference and the number of rotations of the engine 101 at the highest number of speeds (e.g., the sixth speed).

According to the characteristic map 411, the characteristic phase difference can be easily obtained by selecting one line, from among the plurality of lines described above, corresponding to the number of speeds obtained on the basis of the result of the detection made by the shift position sensor 135, and then extracting a point corresponding to the number of rotations of the engine 101 obtained on the basis of the result of the detection made by the crank angle sensor 131.

In this way, the correction amount calculation module 406 obtains the characteristic phase difference by referring to the characteristic map 411 on the basis of the number of rotations of the engine 101 and the number of speeds of the transmission 103 in the first embodiment.

In the first embodiment, the correction amount calculation module 406 calculates the correction amount to be applied to the reversed phase torque on the basis of the difference between the actual phase difference and the characteristic phase difference. As described above, the actual phase difference corresponds to the torsion angle between the input inertial member 201 and the output inertial member 203, and the characteristic phase difference corresponds to the torsion angle between the intermediate inertial member 202 and the output inertial member 203. Thus, if the actual phase difference is denoted by Δta and the characteristic phase difference is denoted by Δtb, the correction amount calculated from the formula (Δta−Δtb), which indicates the difference therebetween, corresponds to the torsion angle between the input inertial member 201 and the intermediate inertial member 202.

Returning to FIG. 2, the correction processing module 407 corrects the reversed phase torque calculated by the reversed-phase-torque calculation module 404 on the basis of the correction amount calculated by the correction amount calculation module 406. More specifically, the phase of the reversed phase torque is shifted (delayed) by the correction amount. This eliminates the effect of the torsion angle between the input inertial member 201 and the intermediate inertial member 202, and enables the calculation of the damping torque that is to be originally estimated in the damper 104 according to the first embodiment and that is capable of canceling out the damper torque in which only the torsion angle between the intermediate inertial member 202 and the output inertial member 203 is taken into account.

Note that a phase delay process as described above can be realized by using the formula $Tq \times (z^{-1})^{\Delta t/Ts}$ by use of a delay operator $z^{-1}$, if the reversed phase torque is denoted by Tq, the correction amount is denoted by Δt, and the control period is denoted by Ts.

The command determination module 408 determines the motor torque command to be provided to the motor generator 102 on the basis of the damping torque calculated by the correction processing module 407 in a case where the determination module 401 determines that the damping torque needs to be output.

The control module 409 then drives the motor generator 102 on the basis of the motor torque command determined by the command determination module 408.

In this way, the command determination module 408 and the control module 409 function as a motor torque command output module that outputs the motor torque command to be provided to the motor generator 102 on the basis of the reversed phase torque the phase of which has been corrected with the phase difference used for correction.

The motor control device 110 according to the first embodiment performs a series of processes in accordance with a processing flow as illustrated in the following FIG. 8, on the basis of the above configuration.

Figure 8:
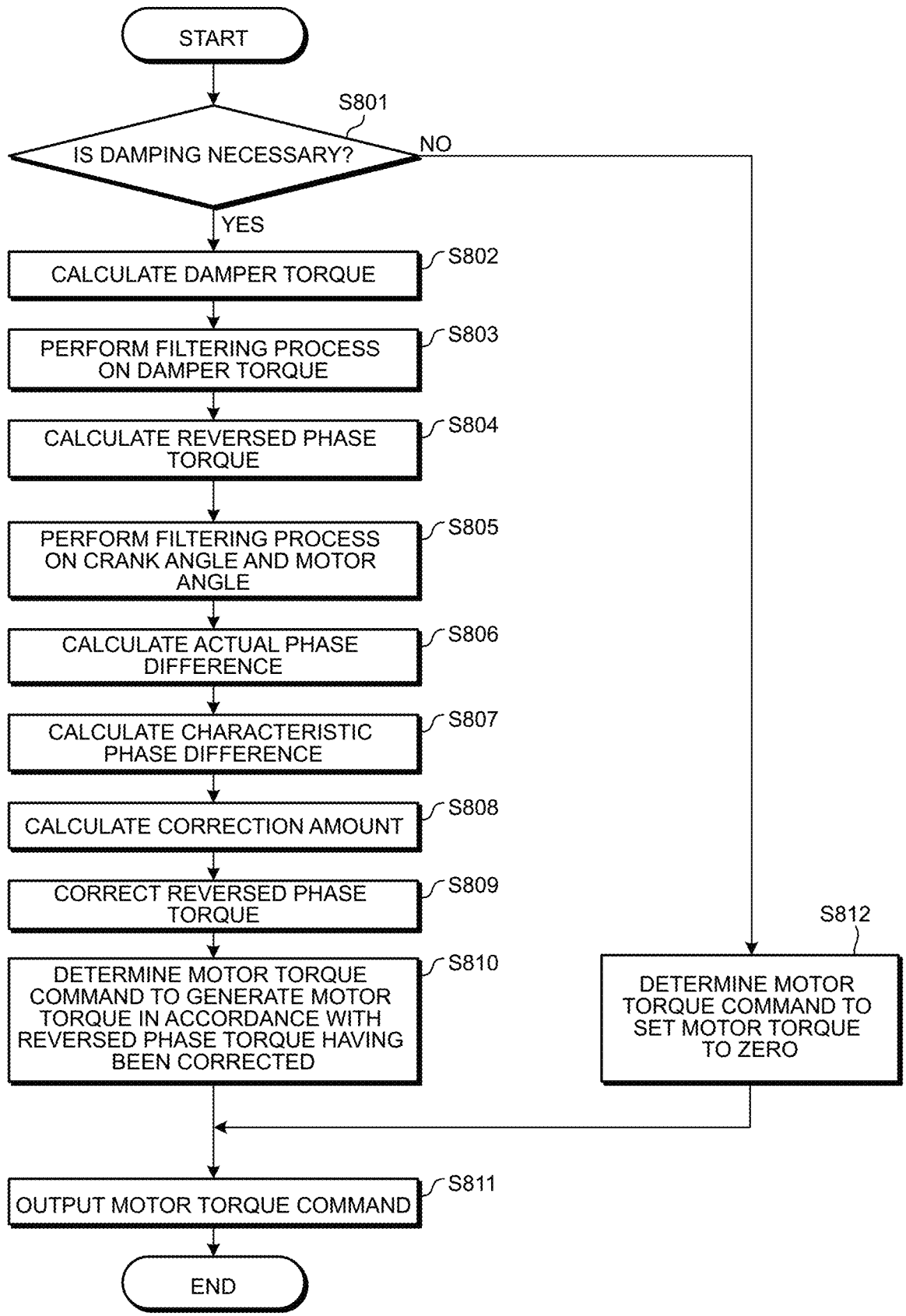
FIG. 8 is an exemplary and schematic flowchart illustrating a series of processes which is performed by the motor control device according to the first embodiment.

FIG. 8 is an exemplary and schematic flowchart illustrating a series of processes which is performed by the motor control device 110 according to the first embodiment.

As illustrated in FIG. 8, initially in S801, the determination module 401 of the motor control device 110 determines whether or not damping by the damping torque is necessary, in the first embodiment. As described above, this determination is made on the basis of the result of the detection made by the accelerator position sensor 133 and the result of the detection made by the clutch position sensor 134.

In S801, if it is determined that the damping is necessary, the processing proceeds to S802. Then in S802, the damper torque calculation module 402 of the motor control device 110 calculates the estimation damper torque through the foregoing calculation based on the result of the detection made by the crank angle sensor 131, the result of the detection made by the motor angle sensor 132, and the rotational spring constant of the damper 104 (a series combined spring constant based on the rotational spring constants of the elastic members 211 and 212).

Then in S803, the filter processing module 403 of the motor control device 110 performs the filtering process on the damper torque calculated in S802. The filtering process performed in S803 is a process of extracting a vibration component corresponding to the primary frequency of the explosion of the engine 101 from the damper torque, as described above.

Then in S804, the reversed-phase-torque calculation module 404 of the motor control device 110 calculates the reversed phase torque, which is in opposite phase of the damper torque, by performing the phase inversion process or the like on the result of the process in S803.

Then in S805, the filter processing module 405 of the motor control device 110 performs the filtering process on the crank angle and the motor angle as the results of the detections made by the crank angle sensor 131 and the motor angle sensor 132, respectively. The filtering process performed in S805 is a process of extracting the vibration components corresponding to the primary frequency of the explosion of the engine 101 from the crank angle and the motor angle as described above.

Then in S806, the correction amount calculation module 406 of the motor control device 110 calculates the actual phase difference corresponding to the torsion angle between the input inertial member 201 and the output inertial member 203 on the basis of the difference between the two vibration components extracted in S805.

Then in S807, the correction amount calculation module 406 of the motor control device 110 calculates a characteristic phase difference corresponding to the torsion angle between the intermediate inertial member 202 and the output inertial member 203 by referring to the characteristic map 411 on the basis of the number of rotations of the engine 101 obtained from the result of the detection made by the crank angle sensor 131 and the number of speeds of the transmission 103 obtained from the result of the detection made by the shift position sensor 135.

Then in S808, the correction amount calculation module 406 of the motor control device 110 calculates a correction amount for the phase of the reversed phase torque calculated in S804 on the basis of the difference between the actual phase difference calculated in S806 and the characteristic phase difference calculated in S807. This correction amount corresponds to the torsion angle between the input inertial member 201 and the intermediate inertial member 202 as described above.

Then in S809, the correction processing module 407 of the motor control device 110 corrects the reversed phase torque calculated in S804 with the correction amount calculated in S808. This eliminates the effect of the torsion angle between the input inertial member 201 and the intermediate inertial member 202, and enables the calculation of the damping torque that is to be originally estimated in the damper 104 according to the first embodiment and that is capable of canceling out the damper torque in which only the torsion angle between the intermediate inertial member 202 and the output inertial member 203 is taken into account.

Then in S810, the command determination module 408 of the motor control device 110 determines the motor torque command to generate the motor torque in accordance with the reversed phase torque having been corrected in S807.

Then in S811, the control module 409 of the motor control device 110 outputs the motor torque command determined in S810 to the motor generator 102. The processing then ends.

Note that, in the first embodiment, if it is determined that the damping is not necessary in S801, the processing proceeds to S812. Then in S812, the command determination module 408 of the motor control device 110 determines the motor torque command to set the motor torque to zero.

After the process in S812, the processing proceeds to S811, as is the case with the operation after the process of S810. Then in S811, the control module 409 of the motor control device 110 outputs the motor torque command to set the motor torque to zero, which is determined in S812, to the motor generator 102. The processing then ends.

As described above, the motor control device 110 according to the first embodiment is applied to the vehicle V provided with the damper 104 that includes the input inertial member 201 connected to the crankshaft 121, the intermediate inertial member 202 connected to the input inertial member 201 via at least the elastic member 211, and the output inertial member 203 connected to the intermediate inertial member 202 via at least the elastic member 212 on the opposite side to the input inertial member 201.

The motor control device 110 according to the first embodiment is further provided with the damper torque calculation module 402, the reversed-phase-torque calculation module 404, the correction amount calculation module 406, and the command determination module 408 and the control module 409 serving as a motor torque command output module. The damper torque calculation module 402 calculates the damper torque which is generated by the damper 104 in accordance with the fluctuations of the engine torque, on the basis of the difference between the crank angle and the motor angle. The reversed-phase-torque calculation module 404 calculates, on the basis of the damper torque calculated by the damper torque calculation module 402, the reversed phase torque which is in the opposite phase to this damper torque. The correction amount calculation module 406 calculates the correction amount for the phase of the reversed phase torque calculated by the reversed-phase-torque calculation module 404 on the basis of the difference between the first value corresponding to the torsion angle between the input inertial member 201 and the output inertial member 203 (actual phase difference) and the second value corresponding to the torsion angle between the intermediate inertial member 202 and the output inertial member 203 (characteristic phase difference). The command determination module 408 and the control module 409 output the motor torque command to be provided to the motor generator 102 on the basis of the reversed phase torque the phase of which has been corrected in accordance with the correction amount calculated by the correction amount calculation module 406.

According to the configuration as described above, the reversed phase torque can be corrected with the correction amount based on the difference between the actual phase difference and the characteristic phase difference so as to eliminate the effect of the torsion angle between the input inertial member 201 and the intermediate inertial member 202. Thus, the vibration occurring in response to the damper torque of the damper 104 including the intermediate inertial member 202 between the input inertial member 201 and the output inertial member 203 can be reduced.

Here, in the first embodiment, the command determination module 408 and the control module 409 output the motor torque command in a case where the clutch 105, which is disposed between the engine 101 and the transmission 103, is in the connected state in which the crankshaft 121 and the input shaft 124 are connected, and output the motor torque command to set the motor torque to zero in a case where the clutch 105 is in the disconnected state in which the connection between the crankshaft 121 and the input shaft 124 is disconnected. According to such a configuration, it is possible to switch between generating and not generating of the motor torque for reducing the effect of the damper torque, depending on whether or not the damper torque is transmitted to the wheel W side via the clutch 105.

Furthermore, in the first embodiment, the command determination module 408 and the control module 409 output the motor torque command to set the motor torque to zero in a case where no acceleration operation of accelerating the vehicle V is being performed even if the clutch 105 is in the connected state. According to such a configuration, it is possible to switch between generating and not generating of the motor torque for reducing the effect of the damper torque depending on whether or not the damper torque is transmitted to the wheel W side via the clutch 105, in further consideration of the presence or absence of the acceleration operation in addition to the state of the clutch 105.

In the first embodiment, the correction amount calculation module 406 obtains the actual phase difference on the basis of the difference in phase of the vibration component corresponding to the primary frequency of the explosion of the engine 101 between the crank angle and the motor angle. According to such a configuration, an appropriate actual phase difference can be easily obtained on the basis of the phase difference between the crank angle and the motor angle.

Further, in the first embodiment, the correction amount calculation module 406 obtains the characteristic phase difference on the basis of the number of rotations of the engine 101 and the number of speeds of the transmission 103. According to such a configuration, it is possible to obtain an appropriate characteristic phase difference while taking into account both the number of rotations of the engine 101 and the number of speeds of the transmission 103, which are considered to be factors that change the characteristic phase difference.

More specifically, in the first embodiment, the motor control device 110 includes the characteristic map 411 serving as a map indicating the relationship between the number of rotations of the engine 101, the number of speeds of the transmission 103, and the characteristic phase difference. The correction amount calculation module 406 then obtains the characteristic phase difference by referring to the characteristic map 411 on the basis of the number of rotations of the engine 101 and the number of speeds of the transmission 103. According to such a configuration, an appropriate characteristic phase difference can easily be obtained by using the characteristic map 411.

Note that, in the first embodiment, the correction amount calculation module 406 obtains the characteristic phase difference while taking into account both the number of rotations of the engine 101 and the number of speeds of the transmission 103. In the first embodiment, however, it may be possible to obtain the characteristic phase difference on the basis of only one of the number of rotations of the engine 101 and the number of speeds of the transmission 103.

Further, in the first embodiment, in a case where the state of the drive system 100 is in a transmission state in which torque is transmitted to the drive shaft 123, the number of rotations of the engine 101 and the number of speeds of the transmission 103 can be obtained from the number of rotations of the motor generator 102 and the like. Furthermore, in the first embodiment, the number of speeds of the transmission 103 can also be obtained from the ratio between the number of rotations of the input shaft 124 of the transmission 103 and the number of rotations of an output shaft of the transmission 103 (not illustrated) and the like.

Hereinafter, a brief description will be provided of a result of a simulation regarding the effects of the technique according to the first embodiment.

Figure 9A:
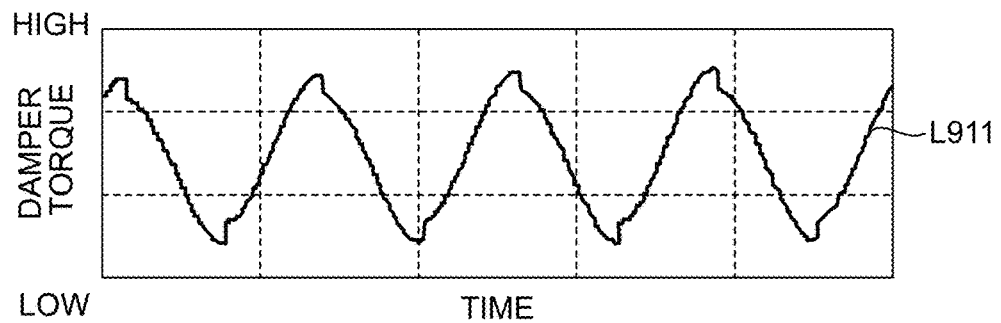
FIGS. 9A to 9C are exemplary and schematic diagrams illustrating fluctuation levels of damper torque, motor torque, and drive shaft torque realized through a technique according to the first embodiment.
Figure 9B:
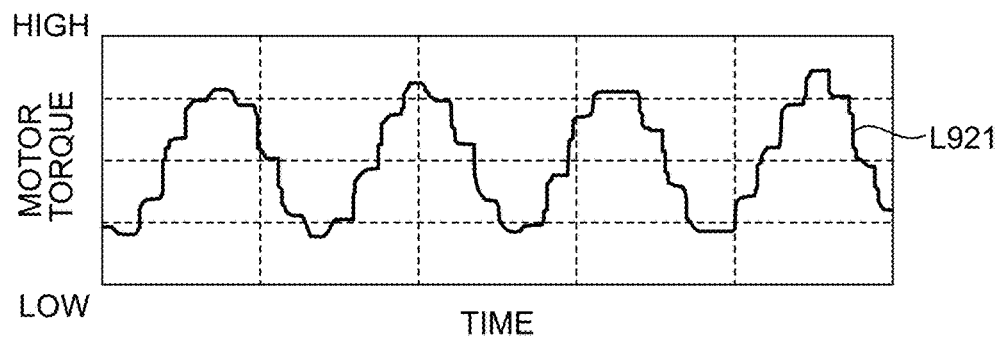
Figure 9C:
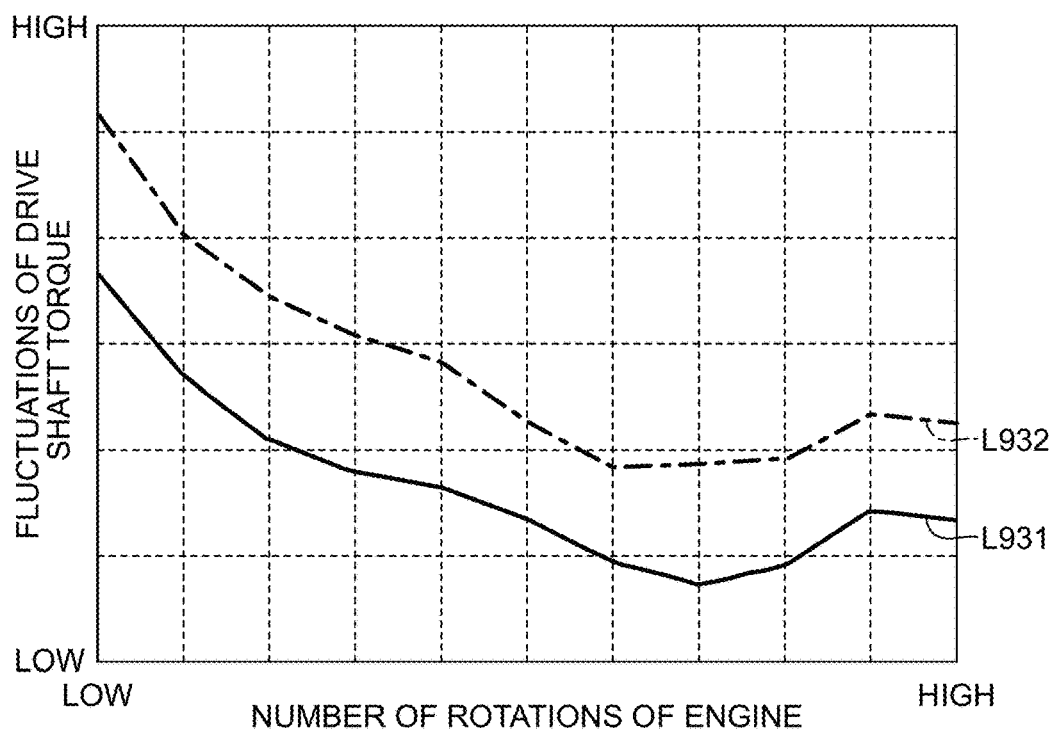

FIGS. 9A to 9C are exemplary and schematic diagrams illustrating fluctuation levels of damper torque, motor torque, and drive shaft torque realized through a technique according to the first embodiment. The FIGS. 9A to 9C can be contrasted with FIGS. 3A to 3C described above.

In an example illustrated in FIG. 9A, solid line L911 corresponds to an example of changes over time in (actual) damper torque of the damper 104 according to the first embodiment. In an example illustrated in FIG. 9B, solid line L921 corresponds to an example of changes over time in the motor torque output as the damping torque in the technique according to the first embodiment.

As can be seen by comparing the solid line L911 with the solid line L921, the damper torque and the motor torque are completely opposite in phase in the technique according to the first embodiment. Therefore, the technique according to the first embodiment can appropriately reduce the fluctuations of the drive shaft torque, as indicated in an example in the following FIG. 9C.

In the example illustrated in FIG. 9C, the solid line L931 corresponds to an example of the fluctuations of the drive shaft torque with respect to the number of rotations of the engine 101 in a case where the damping control that attempts to cancel out the damper torque illustrated in FIG. 9A is performed with the motor torque illustrated in FIG. 9B. Single chain line L932 corresponds to an example of the fluctuations of the drive shaft torque with respect to the number of rotations of the engine 101 in a case where the damping control is not performed.

As can be seen by comparing the solid line L931 with the single chain line L932, in the technique according to the first embodiment, the level of the fluctuations of the drive shaft torque is clearly improved in a case where the damping control is performed than in a case where the damping control is not performed. This is because, in the technique according to the first embodiment, the motor torque is determined after the appropriate correction of the reversed phase torque based on the estimation damper torque corresponding to the torsion angle between the input inertial member 201 and the output inertial member 203, as described above.

Figure 10:
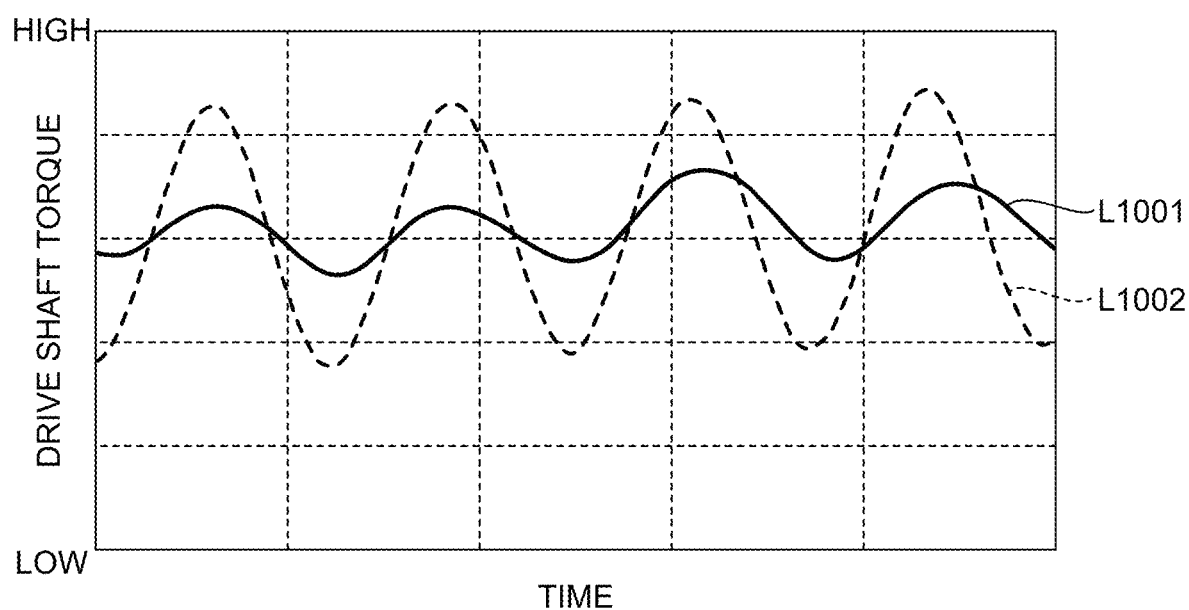
FIG. 10 is an exemplary and schematic diagram illustrating an effect of a comparison between a technique according to the first embodiment and a technique according to the first comparative example.

Further, FIG. 10 is an exemplary and schematic diagram illustrating a comparison of an effect between a technique according to the first embodiment and a technique according to the first comparative example.

In an example illustrated in FIG. 10, solid line L1001 corresponds to an example of changes over time in the drive shaft torque obtained through the technique according to the first embodiment, and dashed line L1002 corresponds to an example of changes over time in the drive shaft torque obtained through the technique according to the first comparative example.

As can be seen by comparing the solid line L1001 with the dashed line L1002, the range of the fluctuations of the drive shaft torque obtained through the technique according to the first embodiment is clearly smaller than the range of the fluctuations of the drive shaft torque obtained through the technique according to the first comparative example. Therefore, the technique according to the first embodiment can further reduce the fluctuations of the drive shaft torque than in the technique according to the first comparative example.

Second Embodiment

Here, a damper configuration that includes a dynamic vibration absorber in addition to an input inertia member and an output inertia member can be considered. In order to estimate the damper torque in this configuration, it is necessary to further take into account the characteristics of the dynamic vibration absorber, that is, dynamic vibration absorption torque generated by the dynamic vibration absorber, in addition to the torsion torque.

The conventional technique described above however does not take into account the dynamic vibration absorption torque, but only the torsion torque. Thus, if the conventional technique described above is applied without change to the damper that includes the dynamic vibration absorber, the damper torque cannot accurately be estimated, and vibrations occurring in response to the damper torque cannot effectively be reduced.

Thus, in the second embodiment, the vibrations occurring in response to the damper torque of the damper including the dynamic vibration absorber is reduced with the configuration and processing as described below.

Figure 11:
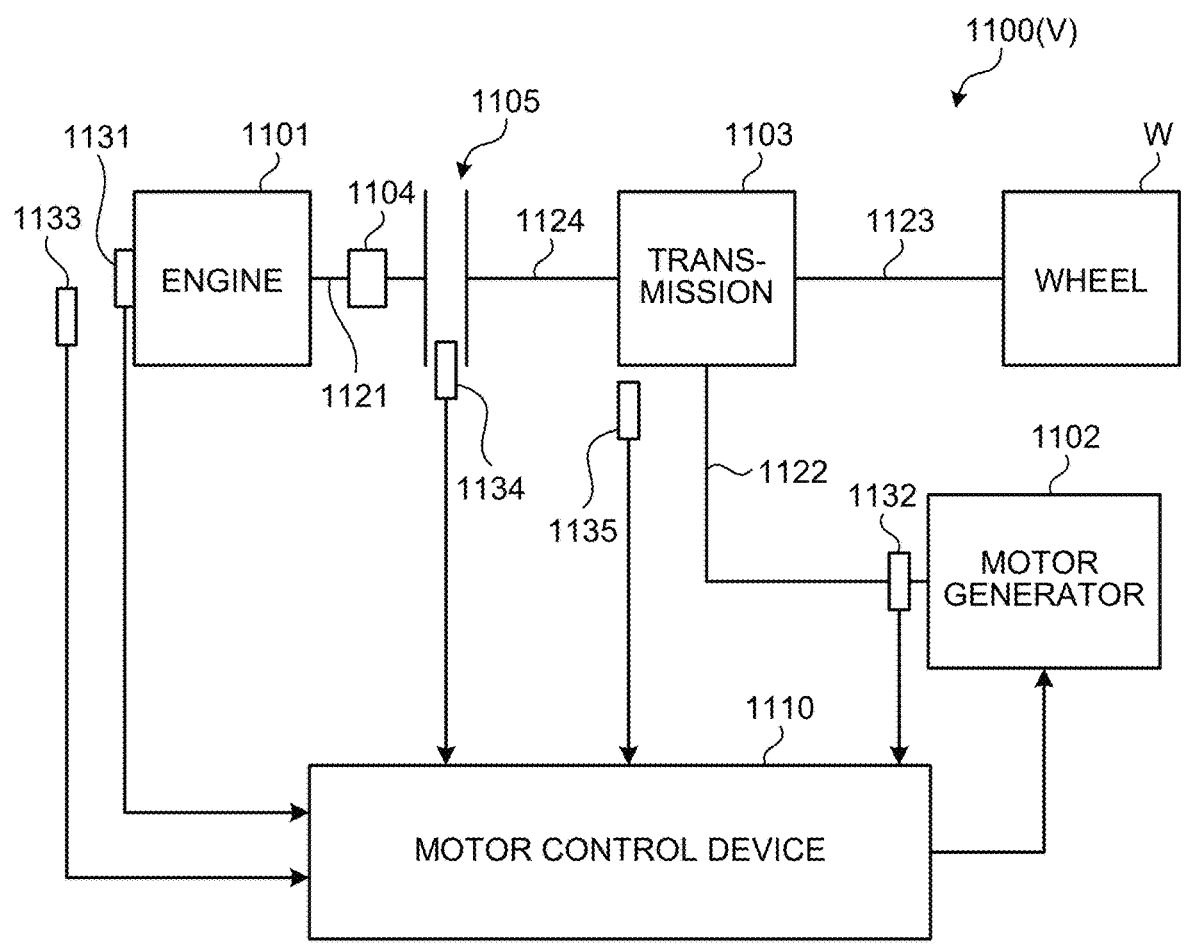
FIG. 11 is an exemplary and schematic block diagram illustrating a configuration of a drive system of a vehicle including a motor control device according to a second embodiment.

FIG. 11 is an exemplary and schematic block diagram illustrating a configuration of a drive system 1100 of a vehicle V including a motor control device 1110 according to a second embodiment.

As illustrated in FIG. 11, the drive system 1100 of the vehicle V according to the second embodiment includes an engine 1101, a motor generator 1102, a transmission 1103, a damper 1104, the clutch 1105, and the motor control device 1110.

The engine 1101 and the motor generator 1102 are each a power source of the vehicle V. The engine 1101 outputs engine torque in accordance with the control of an engine ECU (not illustrated) to rotate a crankshaft 1121. Similarly, the motor generator 1102 outputs motor torque in accordance with the control of the motor control device 1110 to rotate a motor shaft 1122.

The transmission 1103 transmits driving torque based on at least one of the engine torque of the crankshaft 1121 of the engine 1101 and the motor torque of the motor shaft 1122 of the motor generator 1102 at a selected change gear ratio to a wheel W side. The driving torque is transmitted to the wheel W side as drive shaft torque via a drive shaft 1123.

The damper 1104 is a torque fluctuation absorbing device which reduces (absorbs) vibrations of the crankshaft 1121, that is, the fluctuations of the engine torque. The damper 1104 generates damper torque based on the torsion torque and dynamic vibration absorption torque in accordance with the fluctuations of the engine torque, on the basis of a configuration as illustrated in the following FIG. 12.

Figure 12:
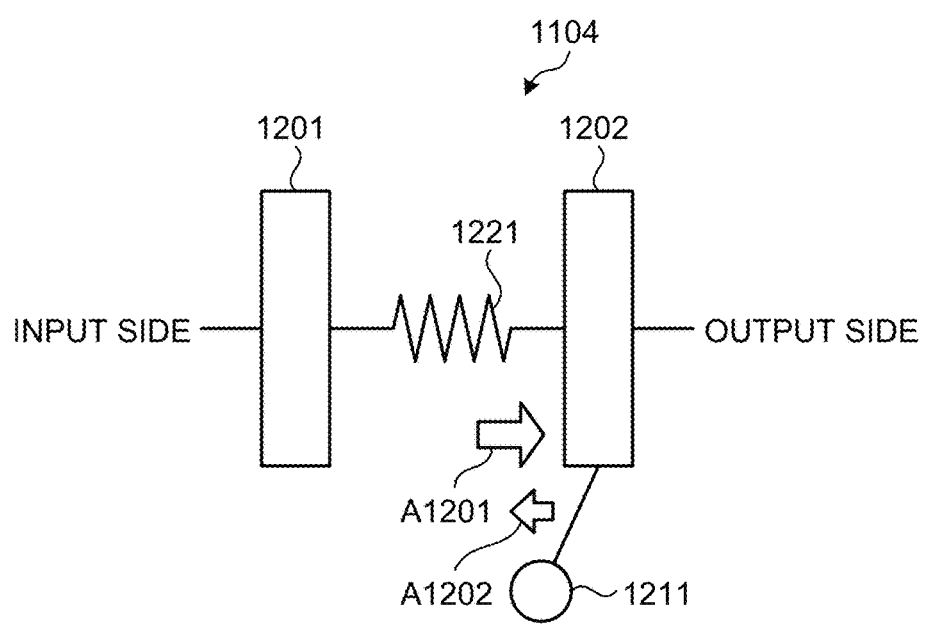
FIG. 12 is an exemplary and schematic diagram illustrating a configuration of a damper according to the second embodiment.

FIG. 12 is an exemplary and schematic diagram illustrating a configuration of the damper 1104 according to the second embodiment. As illustrated in FIG. 12, the damper 1104 according to the second embodiment includes an input inertial member 1201, an output inertial member 1202, a dynamic vibration absorber 1211, and an elastic member 1221. The input inertial member 1201 and the output inertial member 1202 each have a structure that is mutually relatively rotatable about the same rotational center, for example.

The input inertial member 1201 is connected to the crankshaft 1121 of the engine 1101. Specifically, the input inertial member 1201 is disposed on an input side to which the fluctuations of the engine torque is input in the damper 1104.

The output inertial member 1202 is connected to the input inertial member 1201 via the elastic member 1221. As a result, the torsion torque (see arrow A1201) that occurs due to torsional deformation of the elastic member 1221 is transmitted between the input inertial member 1201 and the output inertial member 1202.

The dynamic vibration absorber 1211 is disposed on the output inertial member 1202. The dynamic vibration absorber 1211 includes, for example, a mass body capable of vibrating, and reduces the vibrations of the output inertial member 1202 with a dynamic vibration absorption torque (see arrow A1202) that occurs due to the vibrations of the mass body.

Such a configuration enables the damper 1104 according to the second embodiment to generate, as (total) damper torque, combined torque of the torsion torque generated by the elastic member 1221 and the dynamic vibration absorption torque generated by the dynamic vibration absorber 1211, as illustrated in the following FIG. 13.

Figure 13:
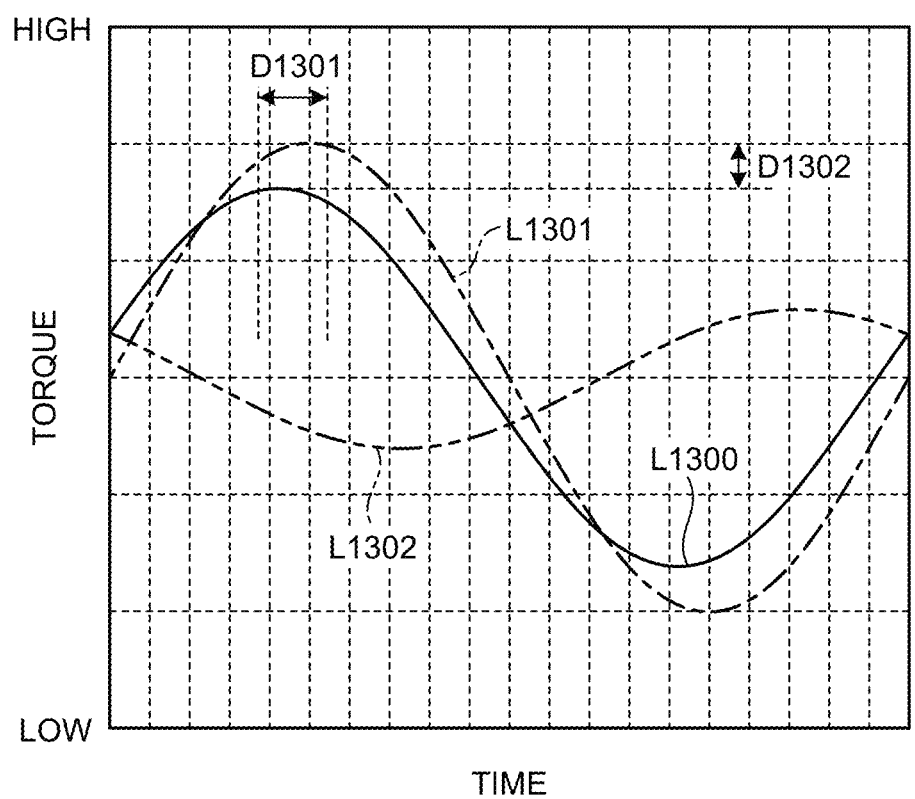
FIG. 13 is an exemplary and schematic diagram illustrating characteristics of the damper according to the second embodiment.

FIG. 13 is an exemplary and schematic diagram illustrating characteristics of the damper 1104 according to the second embodiment. In the example illustrated in FIG. 13, solid line L1300 corresponds to changes over time in the (total) damper torque generated by the damper 1104. Single chain line L1301 corresponds to changes over time in the torsion torque generated by the elastic member 1221 out of the damper torque. Two-dot chain line L1302 corresponds to changes over time in the dynamic vibration absorption torque generated by the dynamic vibration absorber 1211 out of the damper torque.

As can be seen from the relationship between the single chain line L1301 and the two-dot chain line L1302 illustrated in FIG. 13 (and arrows A1201 and A1202 illustrated in FIG. 12), the dynamic vibration absorption torque exhibits the nature to cancel out the torsion torque. Note that the amplitude of the dynamic vibration absorption torque is smaller than the amplitude of the torsion torque, and the phase of the dynamic vibration absorption torque and the phase of the torsion torque are not in a perfect opposite phase relationship.

Thus, in the second embodiment, the damper torque, which is the combined torque of the torsion torque and the dynamic vibration absorption torque, indicates such changes over time that includes a phase shift from the torsion torque, indicated by dimension D1301, and an amplitude shift from the torsion torque, indicated by dimension D1302 (see solid line L1300 and single chain line L1301).

Returning to FIG. 11, the clutch 1105 which is disposed between the engine 1101 and the transmission 1103 switches between connection and disconnection between the crankshaft 1121 of the engine 1101 and the input shaft 1124 of the transmission 1103.

More specifically, the clutch 1105 executes the transmission of the torque (at least part of the torque) between the crankshaft 1121 and an input shaft 1124 in a case where the clutch 1105 is in a connected state in which the crankshaft 1121 and the input shaft 1124 are connected, and blocks the transmission of the torque between the crankshaft 1121 and the input shaft 1124 in a case where the clutch 1105 is in a disconnected state in which the connection between the crankshaft 1121 and the input shaft 1124 is disconnected.

The motor control device 1110 is, for example, an electronic control module (ECU) configured as a microcomputer provided with hardware, such as a processor and a memory, similar to that of an ordinary computer. The motor control device 1110 controls the motor torque of the motor generator 1102 by providing a motor torque command as a command value to the motor generator 1102.

The motor control device 1110 can use various sensors disposed in the vehicle V for control. In an example illustrated in FIG. 11, a crank angle sensor 1131, a motor angle sensor 1132, an accelerator position sensor 1133, a clutch position sensor 1134, and a shift position sensor 1135 are illustrated as the various sensors.

The crank angle sensor 1131 detects a crank angle as a rotation angle of the crankshaft 1121. Use of the result of the detection made by the crank angle sensor 1131 enables the detection of the number of rotations of the engine 1101. The crank angle sensor 1131 is an example of a "first sensor" and also an example of a "third sensor".

The motor angle sensor 1132 detects the motor angle which is the rotation angle of the motor shaft 1122. The motor angle sensor 1132 is an example of a "second sensor".

The accelerator position sensor 1133 detects whether or not an acceleration operation of accelerating the vehicle V is being performed by a driver by detecting an operation amount (operation position) and the like of an acceleration operation unit for operating the acceleration operation (not illustrated), such as an accelerator pedal.

The clutch position sensor 1134 detects whether the clutch 1105 is in the connected state or the disconnected state by detecting an operation amount (operation position) and the like of a clutch operation unit for operating the clutch 1105 (not illustrated), such as a clutch pedal.

The shift position sensor 1135 detects the number of speeds (shift stage) that is currently set in the transmission 1103. The shift position sensor 1135 is an example of a "fourth sensor".

By the way, as described above, a conventional technique has been known in which vibrations occurring due to damper torque are reduced by estimating the damper torque generated by a damper and outputting motor torque that is in reverse phase to the estimated damper torque. Here, the damper does not include a configuration corresponding to the dynamic vibration absorber 1211 according to the second embodiment, that is, the damper includes (only) a configuration corresponding to the input inertial member 1201 and a configuration corresponding to the output inertial member 1202. In such a conventional technique, the damper torque is estimated on the basis of a difference between the crank angle and the motor angle as a torsion torque corresponding to a torsion angle between the input inertial member 1201 and the output inertial member 1202.

However, in the configuration that includes the dynamic vibration absorber 1211, such as the damper 1104 according to the second embodiment, the vibrations occurring in response to the damper torque cannot be appropriately reduced if the characteristics of the dynamic vibration absorber 1211, that is, the dynamic vibration absorption torque generated by the dynamic vibration absorber 1211, are not further taken into account in addition to the torsion torque.

More specifically, the damper 1104 including the dynamic vibration absorber 1211 generates the damper torque having a phase shift and an amplitude shift from the torsion torque as the combined torque of the torsion torque and the dynamic vibration absorption torque, as described above. In the conventional technique described above, however, only the torsion torque is taken into account. Thus, even if the conventional technique described above is applied without change to the damper 1104 including the dynamic vibration absorber 1211, the damper torque to be canceled with the motor torque cannot be accurately estimated. As a result, the vibrations occurring in response to the damper torque cannot be appropriately reduced.

Figure 14:
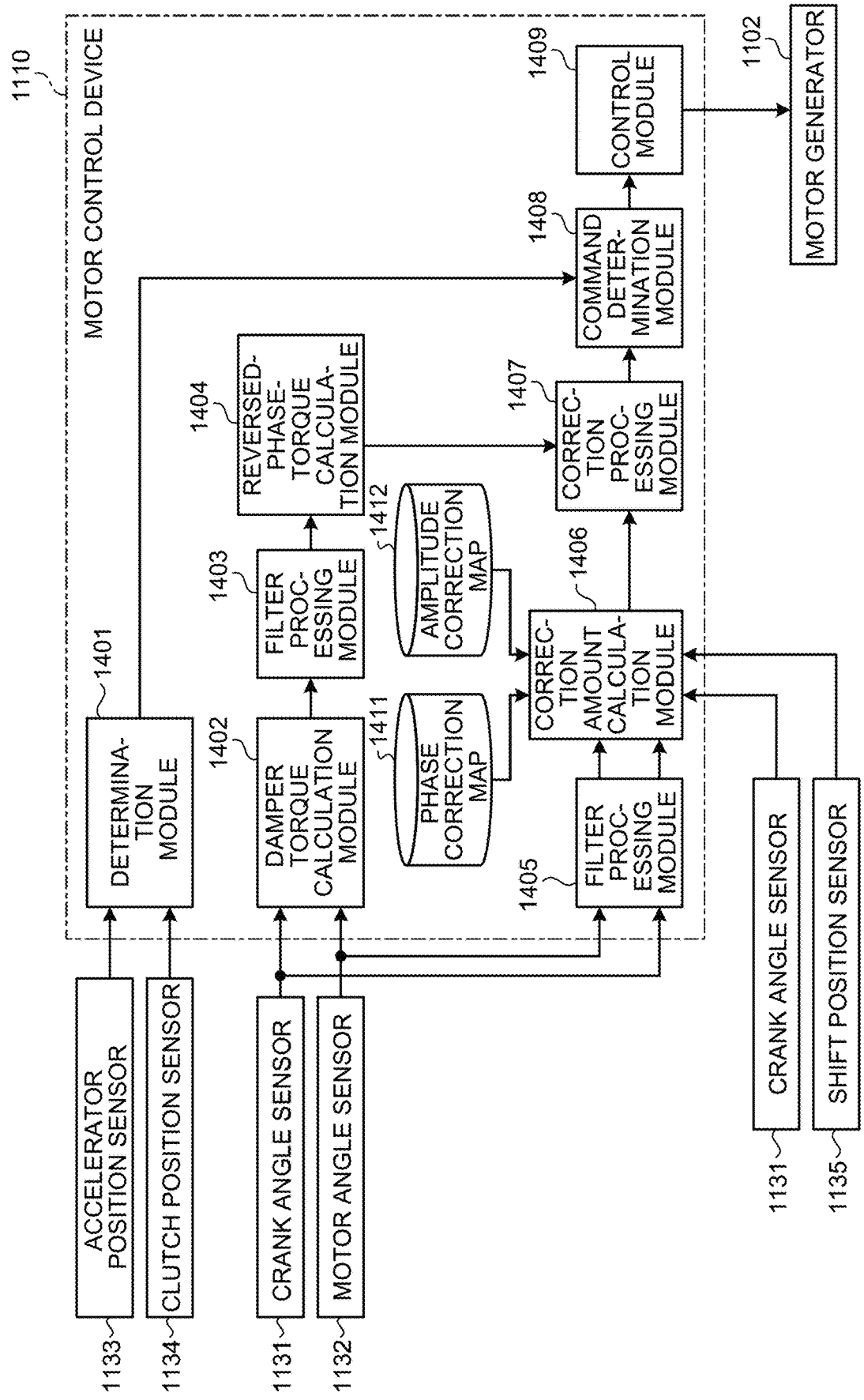
FIG. 14 is an exemplary and schematic block diagram illustrating a functional module group included in the motor control device according to the second embodiment.

Thus, in the second embodiment, a functional module group as illustrated in the following FIG. 14 is realized in the motor control device 1110, thus realizing appropriate reduction of the vibrations occurring in response to the damper torque of the damper 1104 including the dynamic vibration absorber 1211.

FIG. 14 is an exemplary and schematic block diagram illustrating a functional module group included in the motor control device 1110 according to the second embodiment. The functional module group illustrated in FIG. 14 is realized by the cooperation of hardware and software, for example, as a result of a processor of the motor control device 1110 reading a control program stored in a memory or the like. Note that, in the second embodiment, part or all of the functional module group illustrated in FIG. 14 may be realized by dedicated hardware (circuit).

As illustrated in FIG. 14, the motor control device 1110 includes a determination module 1401, a damper torque calculation module 1402, a filter processing module 1403, a reversed-phase-torque calculation module 1404, a filter processing module 1405, a correction amount calculation module 1406, a correction processing module 1407, a command determination module 1408, and a control module 1409. The motor control device 1110 further includes a phase correction map 1411 and an amplitude correction map 1412 as data to be used for control.

The determination module 1401 determines whether or not to output the motor torque for canceling out the damper torque to reduce the vibrations of the drive shaft 1123 on the basis of results of the detections made by the accelerator position sensor 1133 and the clutch position sensor 1134. Note that the motor torque for reducing the vibrations of the drive shaft 1123 may be referred to as damping torque in the following.

For example, in a case where the clutch 1105 is in the disconnected state, or in a case where the clutch 1105 is in the connected state but no acceleration operation is being performed, the fluctuations of the engine torque is not transmitted to the drive shaft 1123, so that there is no need to output the damping torque. Accordingly, in order to set the damping torque to zero, the determination module 1401 notifies the command determination module 1408 that there is no need to output the damping torque, in such a case.

On the other hand, in a case where the clutch 1105 is in the connected state and the acceleration operation is being performed, the fluctuations of the engine torque is transmitted to the drive shaft 1123, so that it is necessary to reduce the vibrations with the damping torque. Accordingly, in order to output the damping torque for canceling out the damper torque, the determination module 1401 notifies the command determination module 1408 that the damping torque needs to be output, in such a case.

The damper torque calculation module 1402 calculates (estimates) calculational damper torque as the torsion torque corresponding to the torsion angle between the input inertial member 1201 and the output inertial member 1202 through the calculation as described below, on the basis of the results of the detections made by the crank angle sensor 1131 and the motor angle sensor 1132.

Specifically, if the crank angle which is the result of the detection made by the crank angle sensor 1131 is denoted by θ1 and the motor angle which is the result of the detection made by the motor angle sensor 1132 is denoted by θ2, the damper torque calculation module 1402 calculates the torsion angle between the input inertial member 1201 and the output inertial member 1202 on the basis of the formula (θ1−θ2), which expresses a difference between θ1 and θ2. Then, if a rotational spring constant of the damper 1104 is denoted by K, the damper torque calculation module 1402 calculates the calculational damper torque on the basis of multiplication of the torsion angle of the damper 1104, which is expressed by (θ1−θ2), by a rotational spring constant K of the elastic member 1221.

The filter processing module 1403 performs a filtering process on the result of the calculation made by the damper torque calculation module 1402 to extract a vibration component corresponding to a primary frequency of the explosion of the engine 1101. The filter processing module 1403 realizes such an extraction process by means of, for example, a bandpass filter the pass-band of which is the frequency band corresponding to the primary frequency of the explosion of the engine 1101.

The reversed-phase-torque calculation module 1404 calculates reversed phase torque that is in reverse phase to the estimation damper torque based on which the damping torque is calculated, by performing a phase inversion process or the like on the result of the extraction made by the filter processing module 1403.

By the way, the damper torque to be actually canceled out in the damper 1104 according to the second embodiment is the combined torque of the torsion torque generated by the elastic member 1221 and the dynamic vibration absorption torque generated by the dynamic vibration absorber 1211, as described above.

In contrast to this, the calculational damper torque to be input to the reversed-phase-torque calculation module 1404 as the basis for the calculation of the reversed phase torque is a value that is calculated on the basis of the torsion angle between the input inertial member 1201 and the output inertial member 1202, that is, the value corresponding only to the torsion torque generated by the elastic member 1221.

Accordingly, in order to effectively reduce the vibrations occurring in response to the damper torque, it is necessary to correct the reversed phase torque calculated by the reversed-phase-torque calculation module 1404 for the shifts (the phase shift and the amplitude shift described above) caused by the dynamic vibration absorption torque generated by the dynamic vibration absorber 1211.

Accordingly, in the second embodiment, a phase correction amount and an amplitude correction amount for correcting the foregoing phase shift and amplitude shift, respectively, are calculated, and the reversed phase torque calculated by the reversed-phase-torque calculation module 1404 is corrected on the basis of the calculation result, with the configuration described below.

The filter processing module 1405 performs the filtering process on the results of the detections made by the crank angle sensor 1131 and the motor angle sensor 1132 to extract vibration components corresponding to the primary frequency of the explosion of the engine 1101. As in the filter processing module 1403 described above, the filter processing module 1405 realizes such an extraction process by means of, for example, a bandpass filter the pass-band of which is the frequency band corresponding to the primary frequency of the explosion of the engine 1101.

The correction amount calculation module 1406 calculates the phase correction amount and the amplitude correction amount for correcting, respectively, the phase shift and the amplitude shift between the actual damper torque generated by the damper 1104 and the calculational damper torque (the torsion torque generated by the elastic member 1221), which occur due to the dynamic vibration absorption torque generated by the dynamic vibration absorber 1211, on the basis of the result of the extraction made by the filter processing module 1405 and the results of the detections made by the accelerator position sensor 1133 and the shift position sensor 1135.

Initially, an explanation will be provided of a method for calculating the phase correction amount that is to be added to or subtracted from the phase component of the reversed phase torque.

The correction amount calculation module 1406 calculates the phase correction amount on the basis of a difference between a first value and a second value, the first value corresponding to a difference in phase between the crank angle and the motor angle assumed on a presumption that the dynamic vibration absorption torque does not occur, the second value corresponding to a difference in phase of a vibration component corresponding to a primary frequency of an explosion of the engine 1101 between the crank angle detected by the crank angle sensor 1131 and the motor angle detected by the motor angle sensor 1132. Note that, hereinafter, the first value may be referred to as a reference phase difference and the second value may be referred to as an actual phase difference.

The actual phase difference can be calculated on the basis of the result of the extraction made by the filter processing module 1405. Specifically, the filter processing module 1405 extracts the vibration component corresponding to the primary frequency of the explosion of the engine 1101 for each of the crank angle as the result of the detection made by the crank angle sensor 1131 and the motor angle as the result of the detection made by the motor angle sensor 1132, as described above. Thus, the actual phase difference is calculated by comparing these extraction results, for example, as in a form illustrated in the following FIG. 15.

Figure 15:
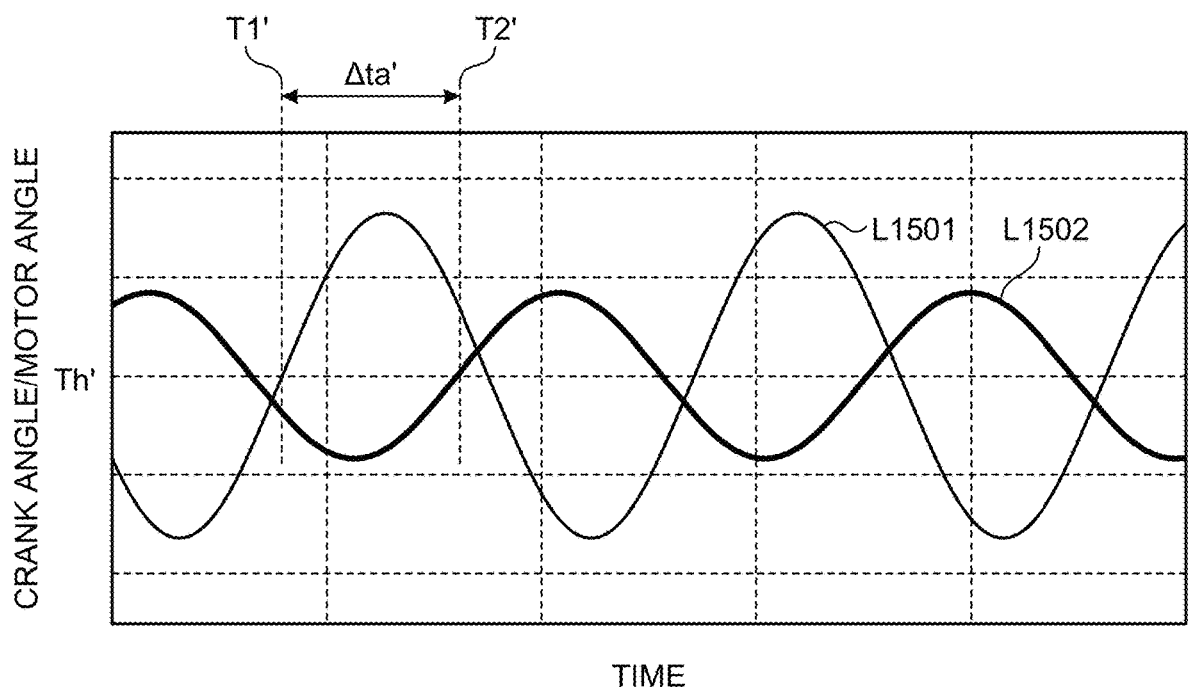
FIG. 15 is an exemplary and schematic diagram illustrating an example of a phase difference between the crank angle and the motor angle in the second embodiment.

FIG. 15 is an exemplary and schematic diagram illustrating an example of the phase difference between the crank angle and the motor angle in the second embodiment. In the example illustrated in FIG. 15, solid line L1501 represents changes over time in the vibration component corresponding to the primary frequency of the explosion of the engine 1101 for the crank angle. Solid line L1502 represents changes over time in the vibration component corresponding to the primary frequency of the explosion of the engine 1101 for the motor angle.

As illustrated in FIG. 15, there is a predetermined time difference Δta (=T1'−T2') between a timing T1' when the crank angle exceeds a predetermined threshold Th' and the timing T2' when the motor angle exceeds the predetermined threshold Th'. The correction amount calculation module 1406 obtains the time difference Δta' on the basis of the result of the extraction made by the filter processing module 1405, and calculates the actual phase difference on the basis of the time difference Δta'. The actual phase difference thus calculated is based on actual measured values for the information regarding the motor angle and the crank angle, so that actual phase difference is a value on which the actual structure of the damper 1104 is reflected, that is, a value in which the effects of both the torsion torque and the dynamic vibration absorption torque are taken into account.

Note that, in the example illustrated in FIG. 15, the actual phase difference may be calculated on the basis of a difference between a timing when the crank angle falls below the predetermined threshold Th' and a timing when the motor angle falls below the predetermined threshold Th'.

In contrast, the reference phase difference can be calculated on the basis of the results of the detections made by the crank angle sensor 1131 and the shift position sensor 1135, and the phase correction map 1411 as illustrated in the following FIG. 16. The phase correction map 1411 is an example of a "first map".

Figure 16:
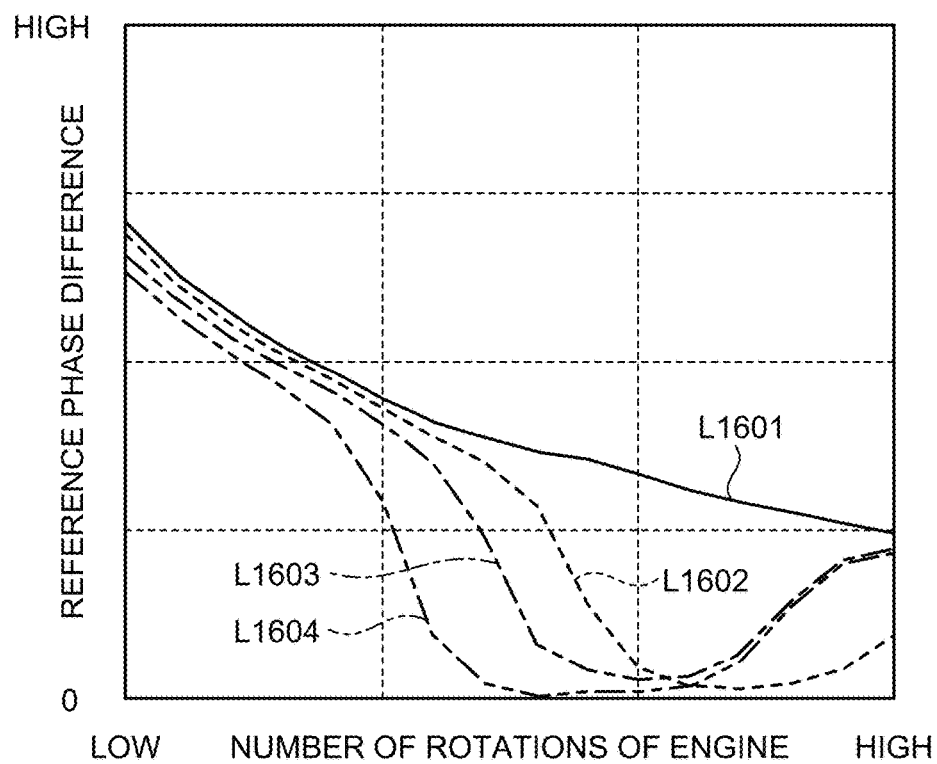
FIG. 16 is an exemplary and schematic diagram illustrating an example of a phase correction map according to the second embodiment.

FIG. 16 is an exemplary and schematic diagram illustrating an example of a phase correction map 1411 according to the second embodiment. As illustrated in FIG. 16, the phase correction map 1411 is data that has been preset as an information indicating the relationship between the number of rotations of the engine 1101, the number of speeds of the transmission 1103, and the reference phase difference.

In the phase correction map 1411, the relationship between the number of rotations of the engine 1101 and the reference phase difference is defined as a plurality of lines each corresponding to the stage of the number of speeds (solid line L1601, dashed line L1602, single chain line L1603, and two-dot chain line L1604). The solid line L1601 corresponds to the relationship between the reference phase difference and the number of rotations of the engine 1101 at the number of speeds in a range from a low speed to a medium speed (e.g., from the first speed to the third speed). The dashed line L1602 corresponds to the relationship between the reference phase difference and the number of rotations of the engine 1101 at the number of speeds higher than the number of speeds for the solid line L1601 (e.g., the fourth speed). Further, the single chain line L1603 corresponds to the relationship between the reference phase difference and the number of rotations of the engine 1101 at the number of speeds even higher than the number of speeds for the dashed line L1602 (e.g., the fifth speed). The two-dot chain line L1604 corresponds to the relationship between the reference phase difference and the number of rotations of the engine 1101 at the highest number of speeds (e.g., the sixth speed).

According to the phase correction map 1411, the reference phase difference which is appropriate depending upon the situation can be easily specified by selecting one line, from among the plurality of lines described above, corresponding to the number of speeds obtained on the basis of the result of the detection made by the shift position sensor 1135, and then extracting a point corresponding to the number of rotations of the engine 1101 obtained on the basis of the result of the detection made by the crank angle sensor 1131.

Thus, in the second embodiment, the correction amount calculation module 1406 obtains the reference phase difference by referring to the phase correction map 1411 on the basis of the number of rotations of the engine 1101 detected by the crank angle sensor 1131 and the number of speeds of the transmission 1103 detected by the shift position sensor 1135. Note that the reference phase difference is a value based on the assumption that no dynamic vibration absorption torque occurs, and thus, it can be said that the reference phase difference is a value in which only the effect of the torsion torque, out of the torsion torque and the dynamic vibration absorption torque, is taken into account.

In the second embodiment, the correction amount calculation module 1406 calculates the phase correction amount to be added to or to be subtracted from the phase component of the reversed phase torque on the basis of the difference between the actual phase difference and the reference phase difference obtained by the above method. As described above, the actual phase difference is a value in which the effects of both the torsion torque and the dynamic vibration absorption torque are taken into account, and the reference phase difference is a value in which only the effect of the torsion torque is taken into account. Thus, if the actual phase difference is denoted by $\Delta ta'$ and the reference phase difference is denoted by $\Delta tb'$, the phase correction amount calculated using the formula $(\Delta ta' - \Delta tb')$, which indicates the difference therebetween, corresponds to the phase shift caused by the effect of the dynamic vibration absorption torque.

Next, an explanation will be provided of a method for calculating the amplitude correction amount by which the amplitude component of the reversed phase torque should be multiplied.

The correction amount calculation module 1406 calculates the amplitude correction amount by referring to the amplitude correction map 1412 illustrated in the following FIG. 17, on the basis of the number of rotations of the engine 1101 detected by the crank angle sensor 1131 and the number of speeds of the transmission 1103 detected by the shift position sensor 1135. The amplitude correction map 1412 is an example of a "second map".

Figure 17:
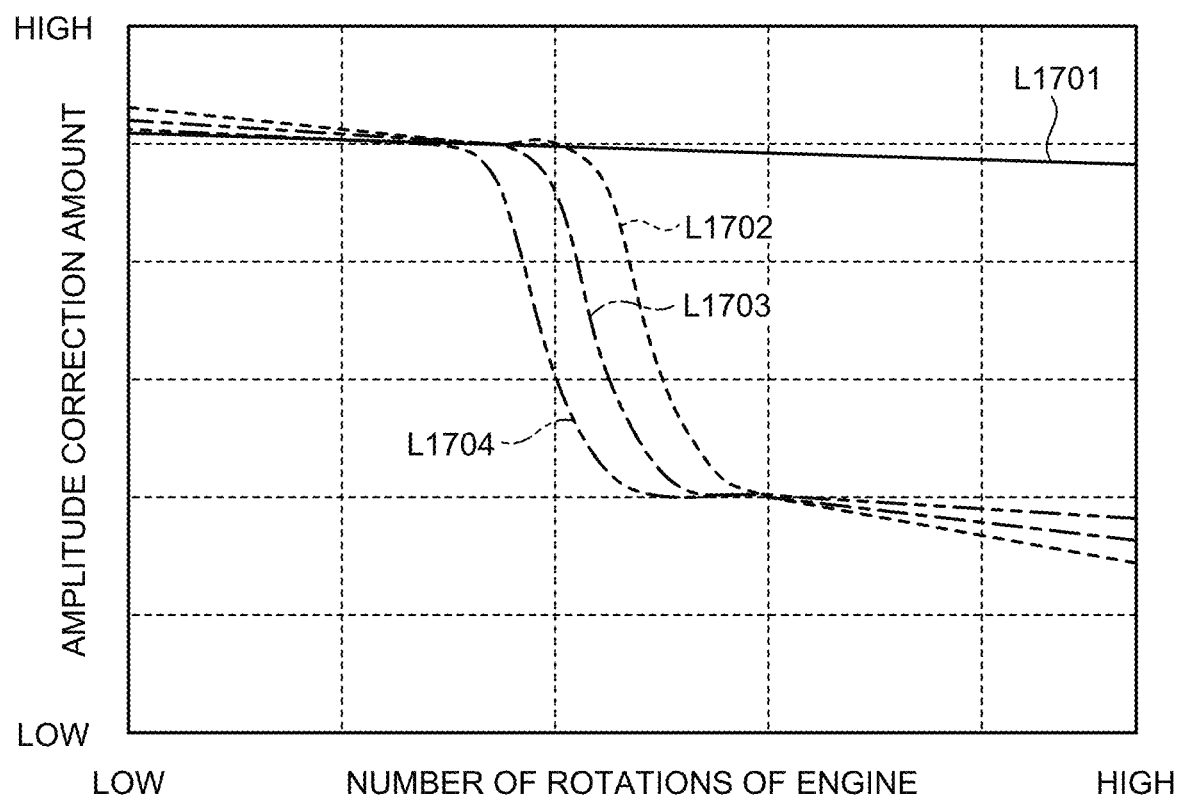
FIG. 17 is an exemplary and schematic diagram illustrating an example of an amplitude correction map according to the second embodiment.

FIG. 17 is an exemplary and schematic diagram illustrating an example of an amplitude correction map 1412 according to the second embodiment; As illustrated in FIG. 17, the amplitude correction map 1412 is data that has been preset as an information indicating the relationship between the number of rotations of the engine 1101, the number of speeds of the transmission 1103, and the amplitude correction amount.

In the amplitude correction map 1412, the relationship between the number of rotations of the engine 1101 and the amplitude correction amount is defined as a plurality of lines each corresponding to the stage of the number of speeds (solid line L1701, dashed line L1702, single chain line L1703, and two-dot chain line L1704). The solid line L1701 corresponds to the relationship between the amplitude correction amount and the number of rotations of the engine 1101 at the number of speeds in a range from a low speed to a medium speed (e.g., from the first speed to the third speed). The dashed line L1702 corresponds to the relationship between the amplitude correction amount and the number of rotations of the engine 1101 at the number of speeds higher than the number of speeds for the solid line L1701 (e.g., the fourth speed). Further, the single chain line L1603 corresponds to the relationship between the amplitude correction amount and the number of rotations of the engine 1101 at the number of speeds even higher than the number of speeds for the dashed line L1702 (e.g., the fifth speed). The two-dot chain line L1704 corresponds to the relationship between the amplitude correction amount and the number of rotations of the engine 1101 at the highest number of speeds (e.g., the sixth speed).

According to the amplitude correction map 1412, the amplitude correction amount which is appropriate depending upon the situation can be easily specified by selecting one line, from among the plurality of lines described above, corresponding to the number of speeds obtained on the basis of the result of the detection made by the shift position sensor 1135, and then extracting a point corresponding to the number of rotations of the engine 1101 obtained on the basis of the result of the detection made by the crank angle sensor 1131.

Through such a method, in the second embodiment, the correction amount calculation module 1406 obtains the phase correction amount and the amplitude correction amount corresponding to the phase shift and the amplitude shift, respectively, between the actual damper torque and the calculational damper torque, which occur due to the dynamic vibration absorption torque, on the basis of the result of the extraction made by the filter processing module 1405, the results of the detections made by the crank angle sensor 1131 and the shift position sensor 1135, the phase correction map 1411, and the amplitude correction map 1412.

Returning to FIG. 12, the correction processing module 1407 then corrects the phase component and the amplitude component of the reversed phase torque calculated by the reversed-phase-torque calculation module 1404 on the basis of the phase correction amount and the amplitude correction amount calculated by the correction amount calculation module 1406, respectively. More specifically, the correction processing module 1407 shifts (delays) the phase component of the reversed phase torque only by the phase correction amount and multiplies the amplitude component of the reversed phase torque by the amplitude correction amount. This cancels the effects of the phase shift and the amplitude shift occurring in the reversed phase torque (calculational damper torque), caused by the dynamic vibration absorption torque, thus enabling the calculation of the damping torque that can appropriately cancel out the actual damper torque, which is the combined torque of both the torsion torque and the dynamic vibration absorption torque.

Note that, if the reversed phase torque is denoted by Tq', the phase correction amount is denoted by Δt', the amplitude correction amount is denoted by G', and a control period is denoted by Ts', the correction process as described above can be realized by the formula $G' \times Tq' \times (z^{-1})^{\Delta t'/Ts'}$ using a delay operator $z^{-1}$.

The command determination module 1408 determines the motor torque command to be provided to the motor generator 1102 on the basis of the damping torque calculated by the correction processing module 1407 in a case where the determination module 1401 determines that the damping torque needs to be output.

The control module 1409 then drives the motor generator 1102 on the basis of the motor torque command determined by the command determination module 1408.

In such a way, the command determination module 1408 and the control module 1409 function as a motor torque command output module that outputs the motor torque command to be provided to the motor generator 1102 on the basis of the reversed phase torque corrected with the phase correction amount and the amplitude correction amount, which are the results of the calculation made by the correction amount calculation module 1406.

The motor control device 1110 according to the second embodiment performs a series of processes in accordance with a processing flow as illustrated in the following FIG. 18, on the basis of the above configuration.

Figure 18:
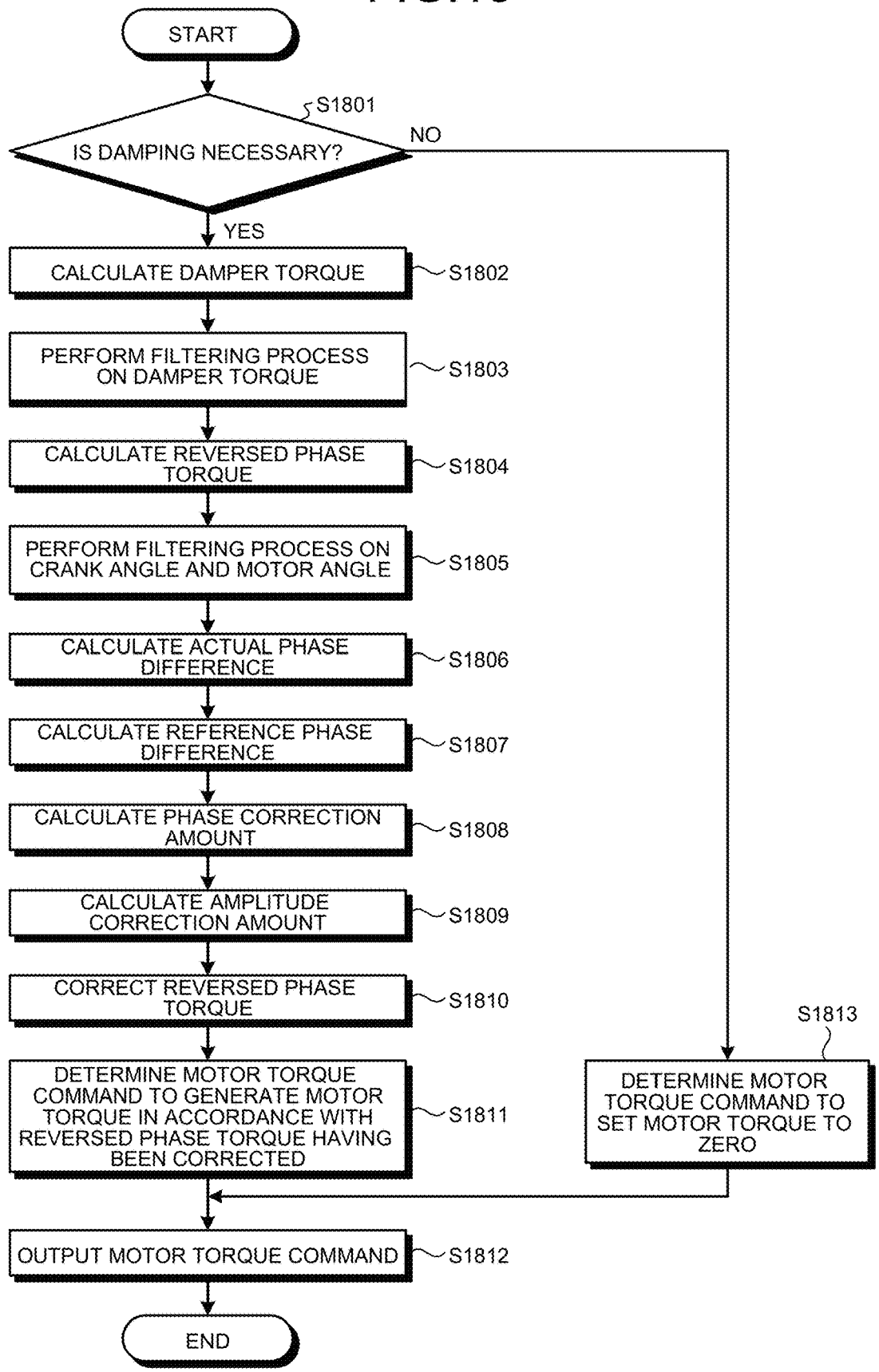
FIG. 18 is an exemplary and schematic flowchart illustrating a series of processes which is performed by the motor control device according to the second embodiment.

FIG. 18 is an exemplary and schematic flowchart illustrating a series of processes which is performed by the motor control device 1110 according to the second embodiment.

As illustrated in FIG. 18, initially in S1801, the determination module 1401 of the motor control device 1110 determines whether or not damping by the damping torque is necessary, in the second embodiment. As described above, this determination is made on the basis of the result of the detection made by the accelerator position sensor 1133 and the result of the detection made by the clutch position sensor 1134.

In S1801, if it is determined that the damping is necessary, the processing proceeds to S1802. Then in S1802, the damper torque calculation module 1402 of the motor control device 1110 calculates the calculational damper torque through the foregoing calculation based on the result of the detection made by the crank angle sensor 1131, the result of the detection made by the motor angle sensor 1132, and the rotational spring constant of the damper 1104.

Then in S1803, the filter processing module 1403 of the motor control device 1110 performs the filtering process on the calculational damper torque calculated in S1802. The filtering process performed in S1803 is a process of extracting a vibration component corresponding to the primary frequency of the explosion of the engine 1101 from the calculational damper torque, as described above.

Then in S1804, the reversed-phase-torque calculation module 1404 of the motor control device 1110 calculates the reversed phase torque, which is in opposite phase of the calculational damper torque, by performing the phase inversion process or the like on the result of the process in S1803.

Then in S1805, the filter processing module 1405 of the motor control device 1110 performs the filtering process on the crank angle and the motor angle as the results of the detections made by the crank angle sensor 1131 and the motor angle sensor 1132, respectively. The filtering process performed in S1805 is a process of extracting the vibration components corresponding to the primary frequency of the explosion of the engine 1101 from the crank angle and the motor angle as described above.

In S1806, the correction amount calculation module 1406 of the motor control device 1110 then calculates the actual phase difference as a value in which both the torsion torque generated by the elastic member 1221 and the dynamic vibration absorption torque generated by the dynamic vibration absorber 1211 are taken into account on the basis of the difference between the two vibration components extracted in S1805.

In S1807, the correction amount calculation module 1406 of the motor control device 1110 then calculates the reference phase difference as a value in which only the effect of the torsion torque generated by elastic member 1221 is taken into account, by referring to the phase correction map 1411 on the basis of the number of rotations of the engine 1101 obtained from the result of the detection made by the crank angle sensor 1131 and the number of speeds of the transmission 1103 obtained from the result of the detection made by the shift position sensor 1135.

In S1808, the correction amount calculation module 1406 of the motor control device 1110 then calculates the phase correction amount corresponding to the phase shift which occurs due to the effect of the dynamic vibration absorption torque, on the basis of the difference between the actual phase difference calculated in S1806 and the reference phase difference calculated in S1807.

In S1809, the correction amount calculation module 1406 of the motor control device 1110 then calculates the amplitude correction amount corresponding to the amplitude shift which occurs due to the effect of the dynamic vibration absorption torque, by referring to the amplitude correction map 1412 on the basis of the number of rotations of the engine 1101 obtained from the result of the detection made by the crank angle sensor 1131 and the number of speeds of the transmission 1103 obtained from the result of the detection made by the shift position sensor 1135.

In S1810, the correction processing module 1407 of the motor control device 1110 then corrects the reversed phase torque calculated in S1804 with the phase correction amount and the amplitude correction amount calculated in S1808 and S1809, respectively. More specifically, the correction processing module 1407 adds or subtracts the phase correction amount to/from the phase component of the reversed phase torque, and multiplies the amplitude component of the reversed phase torque by the amplitude correction amount. This cancels the effects of the phase shift and the amplitude shift occurring in the reversed phase torque (calculational damper torque), caused by the dynamic vibration absorption torque, thus enabling the calculation of the damping torque that can appropriately cancel out the actual damper torque, which is the combined torque of both the torsion torque and the dynamic vibration absorption torque.

Then in S1811, the command determination module 1408 of the motor control device 1110 determines the motor torque command to generate the damping torque that is the motor torque corresponding to the reversed phase torque having been corrected in S1810.

Then in S1812, the control module 1409 of the motor control device 1110 outputs the motor torque command determined in S1811 to the motor generator 1102. The processing then ends.

In the second embodiment, if it is determined that damping is not necessary in S1801, the processing proceeds to S1813. In this case, since the output of the damping torque is unnecessary, in S1813, the command determination module 1408 of the motor control device 1110 determines the motor torque command to set the motor torque to zero.

After the process in S1813, the processing proceeds to S1812, as is the case with the operation after the process of S1811. Then in S1812, the control module 1409 of the motor control device 1110 outputs the motor torque command to set the motor torque to zero, which is determined in S1813, to the motor generator 1102. The processing then ends.

As described above, the motor control device 1110 according to the second embodiment is applied to a vehicle V provided with the damper 1104, which includes the input inertial member 1201 connected to the crankshaft 1121, the output inertial member 1202 connected to the input inertial member 1201 via the elastic member 1221, and the dynamic vibration absorber 1211 disposed on the output inertial member 1202.

Further, the motor control device 1110 according to the second embodiment includes the damper torque calculation module 1402, the reversed-phase-torque calculation module 1404, the correction amount calculation module 1406, and the command determination module 1408 and the control module 1409 serving as the motor torque command output module. The damper torque calculation module 1402 calculates the calculational damper torque which is generated by the damper 1104 in accordance with the fluctuations of the engine torque on the basis of the difference between the crank angle detected by the crank angle sensor 1131 and the motor angle detected by the motor angle sensor 1132. The reversed-phase-torque calculation module 1404 calculates the reversed phase torque that is in reverse phase to the calculational damper torque calculated by the damper torque calculation module 1402. The correction amount calculation module 1406 calculates the phase correction amount and the amplitude correction amount for correcting, respectively, the phase shift and the amplitude shift between the actual damper torque generated by the damper 1104 and the calculational damper torque, which occur due to the dynamic vibration absorption torque generated by the dynamic vibration absorber 1211, on the basis of at least the crank angle detected by the crank angle sensor 1131 and the motor angle detected by the motor angle sensor 1132. The command determination module 1408 and the control module 1409 output the motor torque command to be provided to the motor generator 1102 on the basis of the reversed phase torque having been corrected on the basis of the phase correction amount and the amplitude correction amount.

According to the configuration described above, the reversed phase torque is corrected on the basis of the phase correction amount and the amplitude correction amount so that the phase shift and the amplitude shift occurring due to the dynamic vibration absorption torque are canceled, and the motor torque command corresponding to the reversed phase torque having been corrected can be output. This enables reduction of the vibrations occurring in response to the damper torque of the damper including the dynamic vibration absorber.

In the second embodiment, the command determination module 1408 and the control module 1409 output the motor torque command in a case where the clutch 1105, which is disposed between the engine 1101 and the transmission 1103, is in the connected state in which the crankshaft 1121 and the input shaft 1124 are connected, and output the motor torque command to set the motor torque to zero in a case where the clutch 1105 is in the disconnected state in which the connection between the crankshaft 1121 and the input shaft 1124 is disconnected. According to such a configuration, it is possible to switch between generating and not generating of the motor torque for reducing the effect of the damper torque, depending on whether or not the damper torque is transmitted to the wheel W side via the clutch 1105.

In addition, in the second embodiment, the command determination module 1408 and the control module 1409 output the motor torque command to set the motor torque to zero in a case where no acceleration operation of accelerating the vehicle V is being performed even if the clutch 1105 is in the connected state. According to such a configuration, it is possible to switch between generating and not generating of the motor torque for reducing the effect of the damper torque depending on whether or not the damper torque is transmitted to the wheel W side via the clutch 1105, in further consideration of the presence or absence of the acceleration operation in addition to the state of the clutch 1105.

Furthermore, in the second embodiment, the correction amount calculation module 1406 calculates the phase correction amount on the basis of a difference between a reference phase difference (a first value) and an actual phase difference (a second value), the first value corresponding to a difference in phase between the crank angle and the motor angle assumed on a presumption that the dynamic vibration absorption torque does not occur, the second value corresponding to a difference in phase of a vibration component corresponding to a primary frequency of an explosion of the engine 1101 between the crank angle detected by the crank angle sensor 1131 and the motor angle detected by the motor angle sensor 1132. According to such a configuration, the phase correction amount corresponding to the phase shift occurring due to the dynamic vibration absorption torque can be easily obtained on the basis of the difference between the reference phase difference and the actual phase difference.

In addition, in the second embodiment, the correction amount calculation module 1406 obtains the reference phase difference on the basis of the number of rotations of the engine 1101 detected by the crank angle sensor 1131 and the number of speeds of the transmission 1103 detected by the shift position sensor 1135. According to such a configuration, an appropriate reference phase difference can be obtained taking into account the number of rotations of the engine 1101 and the number of speeds of the transmission 1103, which are possible factors that change the reference phase difference.

More specifically, in the second embodiment, the motor control device 1110 further includes the phase correction map 1411 indicating the relationship between the number of rotations of the engine 1101, the number of speeds of the transmission 1103, and the reference phase difference. The correction amount calculation module 1406 obtains the reference phase difference by referring to the phase correction map 1411 on the basis of the number of rotations of the engine 1101 detected by the crank angle sensor 1131 and the number of speeds of the transmission 1103 detected by the shift position sensor 1135. According to such a configuration, an appropriate reference phase difference can easily be obtained by using the phase correction map 1411.

In addition, in the second embodiment, the correction amount calculation module 1406 obtains the amplitude correction amount on the basis of the number of rotations of the engine 1101 detected by the crank angle sensor 1131 and the number of speeds of the transmission 1103 detected by the shift position sensor 1135. According to such a configuration, an appropriate amplitude correction amount can be obtained taking into account the number of rotations of the engine 1101 and the number of speeds of the transmission 1103, which are possible factors that change the amplitude correction amount in accordance with the amplitude shift occurring due to the dynamic vibration absorption torque.

More specifically, in the second embodiment, the motor control device 1110 further includes the amplitude correction map 1412 indicating the relationship between the number of rotations of the engine 1101, the number of speeds of the transmission 1103, and the amplitude correction amount. The correction amount calculation module 1406 obtains the amplitude correction amount by referring to the amplitude correction map 1412 on the basis of the number of rotations of the engine 1101 detected by the crank angle sensor 1131 and the number of speeds of the transmission 1103 detected by the shift position sensor 1135. According to such a configuration, an appropriate amplitude correction amount can easily be obtained by using the amplitude correction map 1412.

A further brief explanation of the effects of the second embodiment will be provided.

Figure 19:
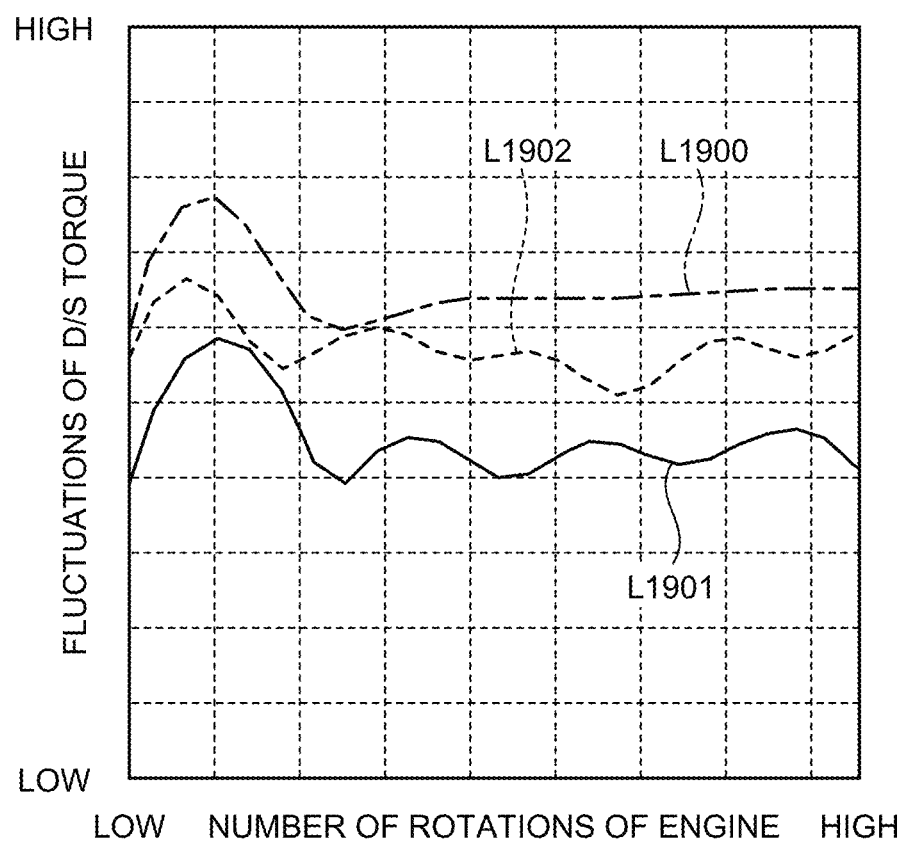
FIG. 19 is an exemplary and schematic diagram illustrating a result of a simulation regarding an effect of the second embodiment.

FIG. 19 is an exemplary and schematic diagram illustrating a result of a simulation regarding an effect of the second embodiment. Note that the expression "D/S torque" beside the vertical axis in FIG. 19 means drive shaft torque.

In the example illustrated in FIG. 19, solid line L1901 represents the relationship between the number of rotations of the engine 1101 and the fluctuations of the drive shaft torque, which is realized through the technique according to the second embodiment in which the damping torque is calculated with the effect of the dynamic vibration absorption torque taken into account. Further, dashed line L1902 represents the relationship between the number of rotations of the engine 1101 and the fluctuations of the drive shaft torque, which is realized through the technique according to a second comparative example in which the damping torque is calculated on the basis of a technical idea similar to the conventional one, with the effect of the dynamic vibration absorption torque not being taken into account. Note that single chain line L1900 represents the relationship between the number of rotations of the engine 1101 and the fluctuations of the drive shaft torque in a case where no damping based on the damping torque is performed.

As can be seen by comparing each of the single chain line L1900, the solid line L1901, and the dashed line L1902, the technique according to the second embodiment can further reduce the fluctuations of the drive shaft torque than in the technique according to the second comparative example. This is because, in the technique according to the second embodiment, the damping torque is determined after the reversed phase torque based on the calculational damper torque corresponding to the torsion torque is appropriately corrected with the phase shift and the amplitude shift which occur due to the dynamic vibration absorption torque taken into account, unlike the technique according to the second comparative example.

Thus, the technique according to the second embodiment produces a higher damping effect than in the technique according to the second comparative example.

Note that in the second embodiment described above, the correction of the reversed phase torque is performed on the basis of both the phase correction amount and the amplitude correction amount. However, even if the reversed phase torque is corrected on the basis of only one of the phase correction amount and the amplitude correction amount, it is still possible to obtain the damping torque that can cancel out the actual damper torque to a certain level compared with, for example, the case where no correction is performed.

Further, in the second embodiment described above, an example is illustrated where the technique in the present disclosure is applied to the damper in which a dynamic vibration absorber is disposed on the output inertial member. However, the technique in the present disclosure can also be applied to a configuration in which the dynamic vibration absorber is disposed on at least one of the input inertial member and the output inertial member.

Furthermore, in the second embodiment described above, the number of rotations of the engine may be determined by methods other than that using the result of the detection made by the crank angle sensor, and the number of speeds of the transmission may be determined by methods other than that using the result of the detection made by the shift position sensor. For example, in a case where the state of the drive system is in a transmission state in which torque is transmitted to the drive shaft, the number of rotations of the engine and the number of speeds of the transmission can be obtained from the number of rotations of the motor generator and the like. Further, the number of speeds of the transmission can also be obtained from the ratio between the number of rotations of the input shaft of the transmission and the number of rotations of an output shaft of the transmission (not illustrated in the second embodiment) and the like.

While the embodiments of the present disclosure have been described above, the embodiments described above are merely examples and are not intended to limit the scope of the invention. The novel embodiments described above can be implemented in various forms, and various omissions, substitutions, and changes can be made without departing from the gist of the invention. The above-described embodiments and variations thereof are included in the scope and gist of the invention, as well as in the scope of the invention described in the claims and their equivalents.

The invention claimed is:

1. A motor control device for a vehicle including: an engine and a motor generator each serving as a power source; a transmission that transmits, to a wheel side, driving torque based on at least one of engine torque of a crankshaft of the engine and motor torque of a motor shaft of the motor generator at a selected change gear ratio; and a damper including an input inertial member connected to the crankshaft, an intermediate inertial member connected to the input inertial member via at least a first elastic member, and an output inertial member connected to the intermediate inertial member via at least a second elastic member on an opposite side to the input inertial member, the damper being configured to reduce vibration of the crankshaft, the motor control device comprising a hardware processor configured to:

calculate damper torque generated by the damper in accordance with a fluctuation of the engine torque on a basis of a difference between a crank angle as a rotation angle of the crankshaft and a motor angle as a rotation angle of the motor shaft;

calculate, on a basis of the calculated damper torque, reversed phase torque in reverse phase to the damper torque;

calculate a correction amount for a phase of the calculated reversed phase torque on a basis of a difference between a first value corresponding to a torsion angle between the input inertial member and the output inertial member and a second value corresponding to a torsion angle between the intermediate inertial member and the output inertial member; and output a motor torque command to be provided to the motor generator on a basis of the reversed phase torque a phase of which has been corrected in accordance with the calculated correction amount.

2. The motor control device according to claim 1, wherein the hardware processor is configured to output the motor torque command in a case where a clutch disposed between the engine and the transmission is in a connected state in which the crankshaft of the engine and an input shaft of the transmission are connected, and output the motor torque command to set the motor torque to zero in a case where the clutch is in a disconnected state in which a connection between the crankshaft and the input shaft is disconnected.

3. The motor control device according to claim 2, wherein the hardware processor is configured to output the motor torque command to set the motor torque to zero in a case where an acceleration operation of accelerating the vehicle is not being performed even if the clutch is in the connected state.

4. The motor control device according to claim 1, wherein the hardware processor is configured to obtain the first value on a basis of a difference in phase of a vibration component corresponding to a primary frequency of an explosion of the engine between the crank angle and the motor angle.

5. The motor control device according to claim 1, wherein the hardware processor is configured to obtain the second value on a basis of at least one of a number of rotations of the engine and a number of speeds of the transmission.

6. The motor control device according to claim 1, further comprising
a map indicating a relationship between a number of rotations of the engine, a number of speeds of the transmission, and the second value,
wherein the hardware processor is configured to obtain the second value by referring to the map on a basis of the number of rotations of the engine and the number of speeds of the transmission.

7. A motor control device for a vehicle including: an engine and a motor generator each serving as a power source; a transmission that transmits, to a wheel side, driving torque based on at least one of engine torque of a crankshaft of the engine and motor torque of a motor shaft of the motor generator at a selected change gear ratio; and a damper including an input inertial member connected to the crankshaft, an output inertial member connected to the input inertial member via an elastic member, and a dynamic vibration absorber disposed on at least one of the input inertial member and the output inertial member, the damper being configured to reduce vibration of the crankshaft, the motor control device comprising a hardware processor configured to:

calculate calculational damper torque that is generated by the damper in accordance with a fluctuation of the engine torque on a basis of a difference between a crank angle as a rotation angle of the crankshaft detected by a first sensor disposed on the vehicle and a motor angle as a rotation angle of the motor shaft detected by a second sensor disposed on the vehicle;

calculate a reversed phase torque in reverse phase to the calculated calculational damper torque;

calculate, on a basis of at least the crank angle detected by the first sensor and the motor angle detected by the second sensor, at least one of a phase correction amount and an amplitude correction amount for correcting, respectively, a phase shift and an amplitude shift between the calculational damper torque and actual damper torque generated by the damper, the phase shift and the amplitude shift occurring due to dynamic vibration absorption torque generated by the dynamic vibration absorber; and output a motor torque command to be provided to the motor generator on a basis of the reversed phase torque having been corrected based on at least one of the phase correction amount and the amplitude correction amount.

8. The motor control device according to claim 7, wherein the hardware processor is configured to output the motor torque command in a case where a clutch disposed between the engine and the transmission is in a connected state in which the crankshaft of the engine and an input shaft of the transmission are connected, and output the motor torque command to set the motor torque to zero in a case where the clutch is in a disconnected state in which a connection between the crankshaft and the input shaft is disconnected.

9. The motor control device according to claim 8, wherein the hardware processor is configured to output the motor torque command to set the motor torque to zero in a case where an acceleration operation of accelerating the vehicle is not being performed even if the clutch is in the connected state.

10. The motor control device according to claim 7, wherein
the hardware processor is configured to calculate the phase correction amount on a basis of a difference between a first value and a second value, the first value corresponding to a difference in phase between the crank angle and the motor angle assumed on a presumption that the dynamic vibration absorption torque does not occur, the second value corresponding to a difference in phase of a vibration component corresponding to a primary frequency of an explosion of the engine between the crank angle detected by the first sensor and the motor angle detected by the second sensor.

11. The motor control device according to claim 10, wherein
the hardware processor is configured to obtain the first value on a basis of a number of rotations of the engine detected by a third sensor disposed on the vehicle and a number of speeds of the transmission detected by a fourth sensor disposed on the vehicle.

12. The motor control device according to claim 11, further comprising a first map indicating a relationship between the number of rotations of the engine, the number of speeds of the transmission, and the first value, wherein the hardware processor is configured to obtain the first value by referring to the first map on a basis of the number of rotations of the engine detected by the third sensor and the number of speeds of the transmission detected by the fourth sensor.

13. The motor control device according to claim 7, wherein the hardware processor is configured to obtain the amplitude correction amount on a basis of the number of rotations of the engine detected by the third sensor disposed on the vehicle and the number of speeds of the transmission detected by the fourth sensor disposed on the vehicle.

14. The motor control device according to claim 13, further comprising a second map indicating a relationship between the number of rotations of the engine, the number of speeds of the transmission, and the amplitude correction amount, wherein the hardware processor is configured to obtain the amplitude correction amount by referring to the second map on a basis of the number of rotations of the engine detected by the third sensor and the number of speeds of the transmission detected by the fourth sensor.

15. The motor control device according to claim 7, wherein the hardware processor is configured to obtain both the phase correction amount and the amplitude correction amount, and the hardware processor is configured to output the motor torque command on a basis of the reversed phase torque that has been corrected so that the phase correction amount is added to or subtracted from a phase component and that an amplitude component is multiplied by the amplitude correction amount.

* * * * *